(12) United States Patent
Chikano et al.

(10) Patent No.: US 9,424,487 B2
(45) Date of Patent: Aug. 23, 2016

(54) IMAGE MATCHING METHOD AND IMAGE PROCESSING SYSTEM

(71) Applicant: FUJITSU LIMITED, Kawasaki-shi, Kanagawa (JP)

(72) Inventors: Megumi Chikano, Kawasaki (JP); Shohei Nakagata, Kawasaki (JP); Ryuta Tanaka, Machida (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/567,451

(22) Filed: Dec. 11, 2014

(65) Prior Publication Data

US 2015/0206029 A1  Jul. 23, 2015

(30) Foreign Application Priority Data

Jan. 22, 2014 (JP) ................................. 2014-009859

(51) Int. Cl.
G06K 9/46 (2006.01)
G06K 9/62 (2006.01)

(52) U.S. Cl.
CPC .................................... G06K 9/6211 (2013.01)

(58) Field of Classification Search
USPC ......................................................... 382/201
See application file for complete search history.

(56) References Cited

U.S. PATENT DOCUMENTS

| | | | |
|---|---|---|---|
| 2008/0298646 A1 | 12/2008 | Wennergren | |
| 2010/0195917 A1 | 8/2010 | Kubota et al. | |
| 2010/0296736 A1 | 11/2010 | Shiiyama et al. | |
| 2011/0254942 A1 | 10/2011 | Suzuki | |
| 2013/0155058 A1* | 6/2013 | Golparvar-Fard | G06T 19/006 345/419 |
| 2014/0044361 A1* | 2/2014 | Lee | G06K 9/4604 382/201 |

FOREIGN PATENT DOCUMENTS

| | | |
|---|---|---|
| JP | 2007-140613 | 6/2007 |
| JP | 2008-529156 | 7/2008 |
| JP | 2010-182013 | 8/2010 |
| JP | 2010-272091 | 12/2010 |
| WO | 2006-080886 | 8/2006 |
| WO | 2010/050206 | 5/2010 |

OTHER PUBLICATIONS

Martin A. Fischler et al., "Random Sample Consensus: A Paradigm for Model Fitting with Applications to Image Analysis and Automated Cartography," Communications of the ACM, Jun. 1981, vol. 24, No. 6 (pp. 381-395).

Kai Ni et al., "GroupSAC: Efficient Consensus in the Presence of Groupings", IEEE International Conference on Computer Vision (ICCV), 2009 (pp. 1-8).

David G. Lowe, "Distinctive Image Features from Scale-Invariant Keypoints," International Journal of Computer Vision, 60(2), 2004 (pp. 91-110).

* cited by examiner

Primary Examiner — Ruiping Li
(74) Attorney, Agent, or Firm — Fujitsu Patent Center

(57) ABSTRACT

A processor of executes the following processes on one or more second feature point pairs for a first feature point pair from among created first pair candidates. A first vector is a vector that connects a first feature point of the first feature point pair and a first feature point of the second feature point pair. A second vector is a vector that connects a second feature point of the first feature point pair and a second feature point of the second feature point pair. The processor determines that a first feature point pair has been deleted from the first pair candidates, on the basis of a comparison result between a predetermined angle and an angle between the first vector and the second vector. The processor performs matching between the first image and the second image on the basis of feature point.

15 Claims, 18 Drawing Sheets

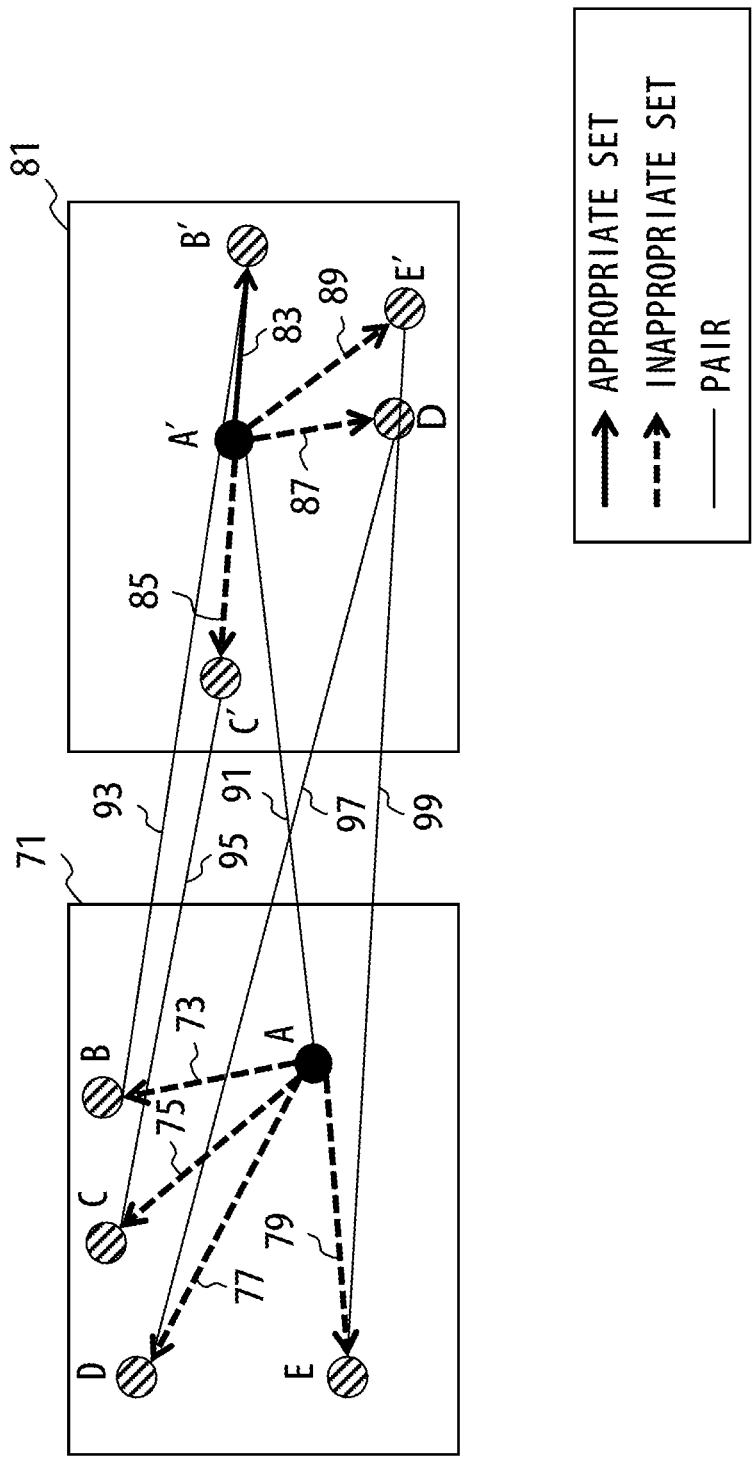
F I G. 4

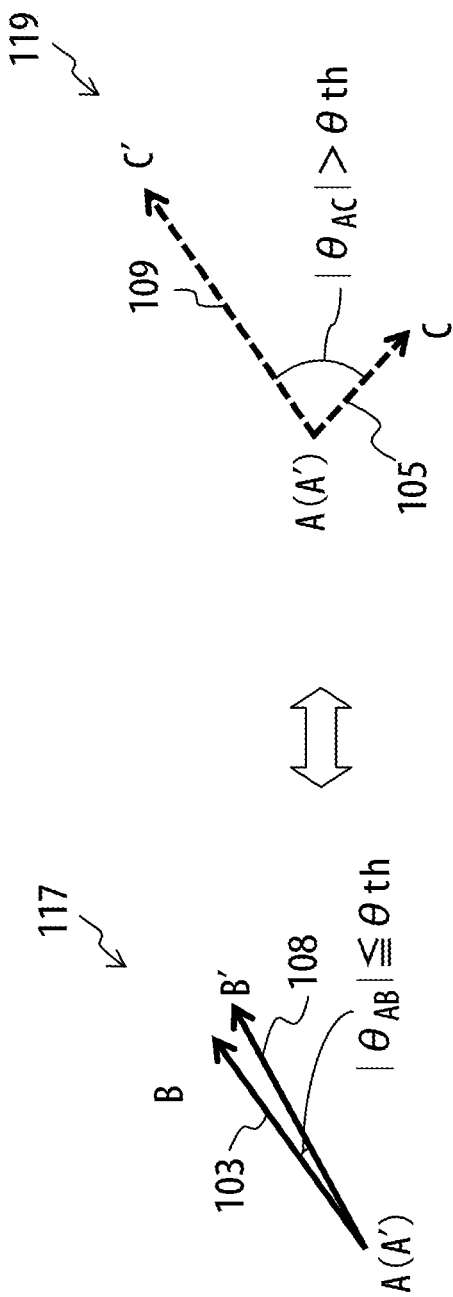
F I G. 6

|     | 1  | 2  | 3  | · · · · | L  |
|-----|----|----|----|---------|----|
| 1   | A  | B  |    |         |    |
| 2   | D  | D  |    |         |    |
| 3   | E  | E  |    |         |    |
| ·   | ·  | ·  | ·  |         | ·  |
| ·   | ·  | ·  | ·  |         | ·  |
| ·   | ·  | ·  | ·  |         | ·  |
| m   |    |    |    |         |    |
| MATRIX | K1 | K2 | K3 |       | KL |

144

F I G. 9

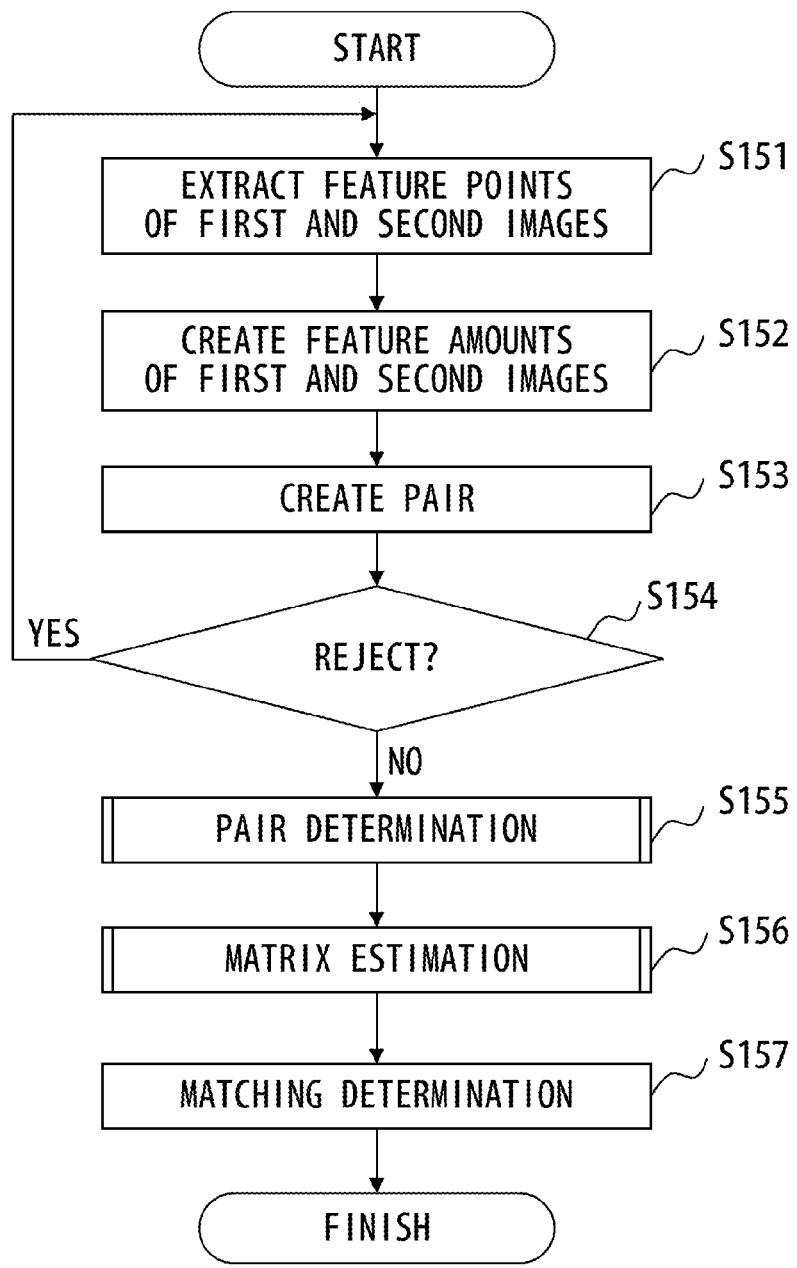
F I G. 1 0

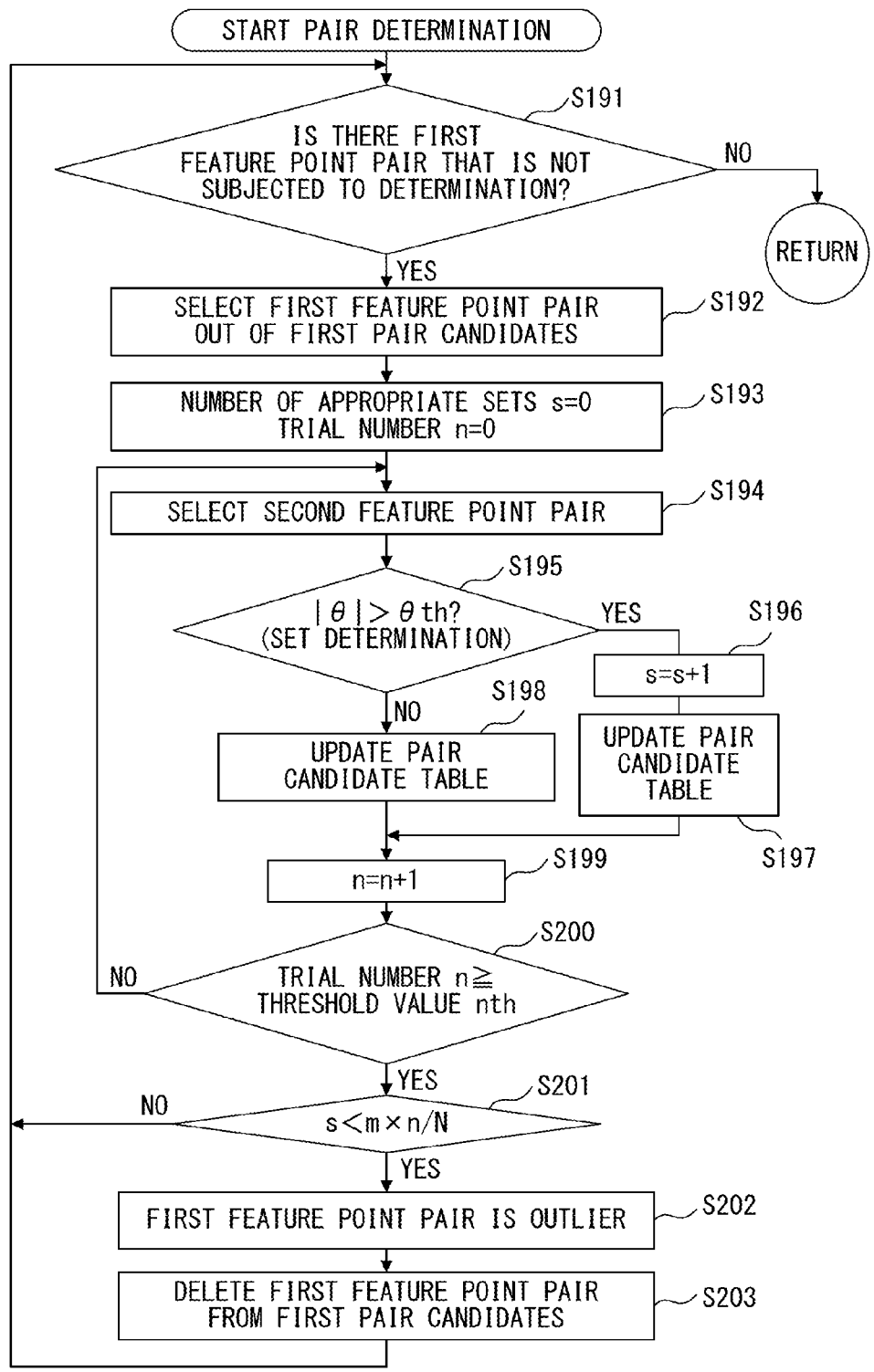
F I G. 11

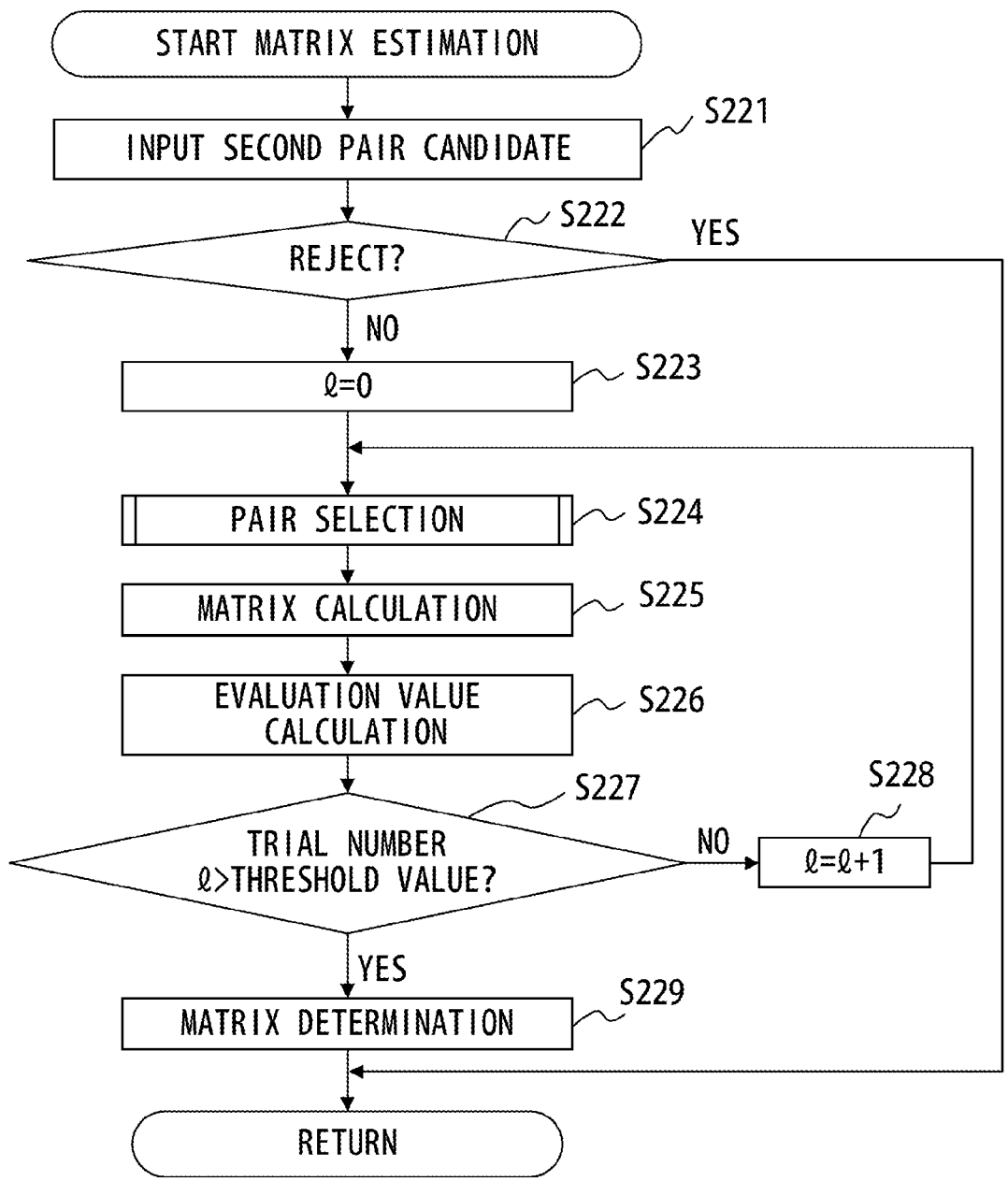
F I G. 1 2

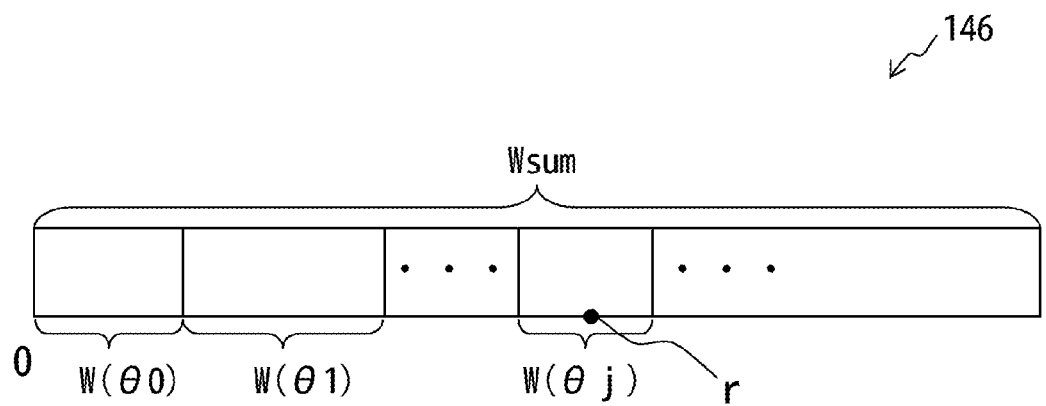
F I G. 1 3

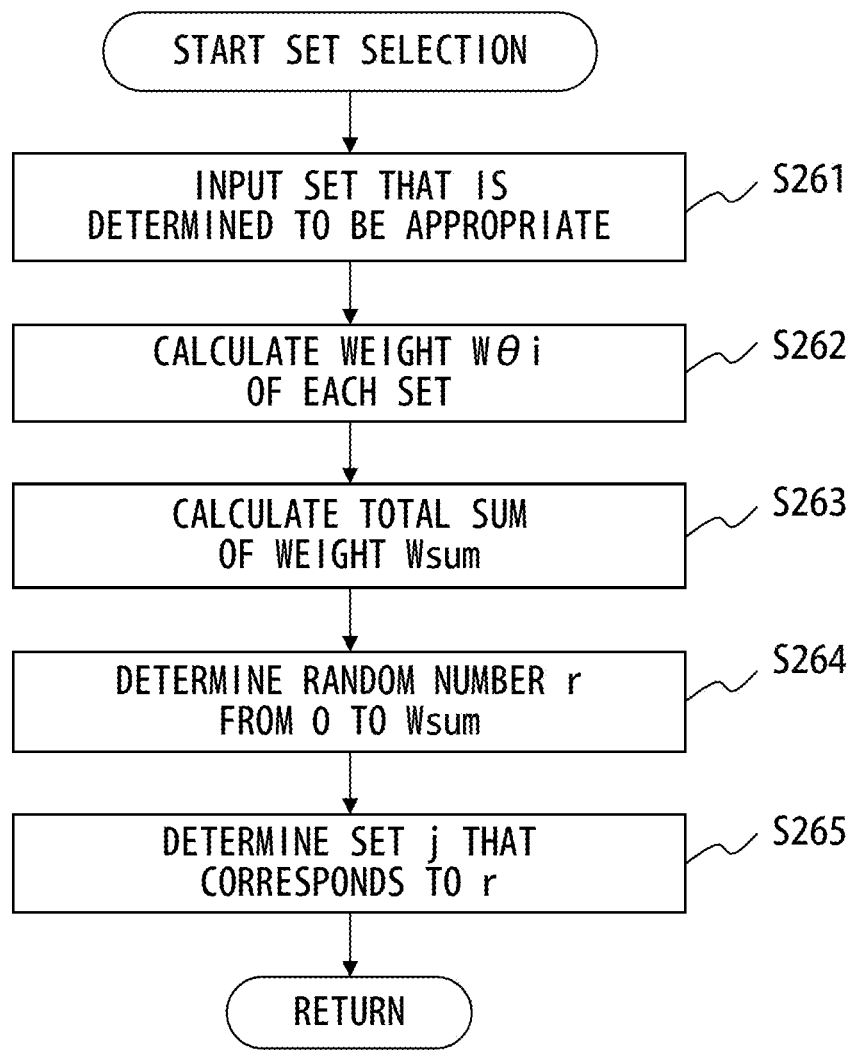
F I G. 17

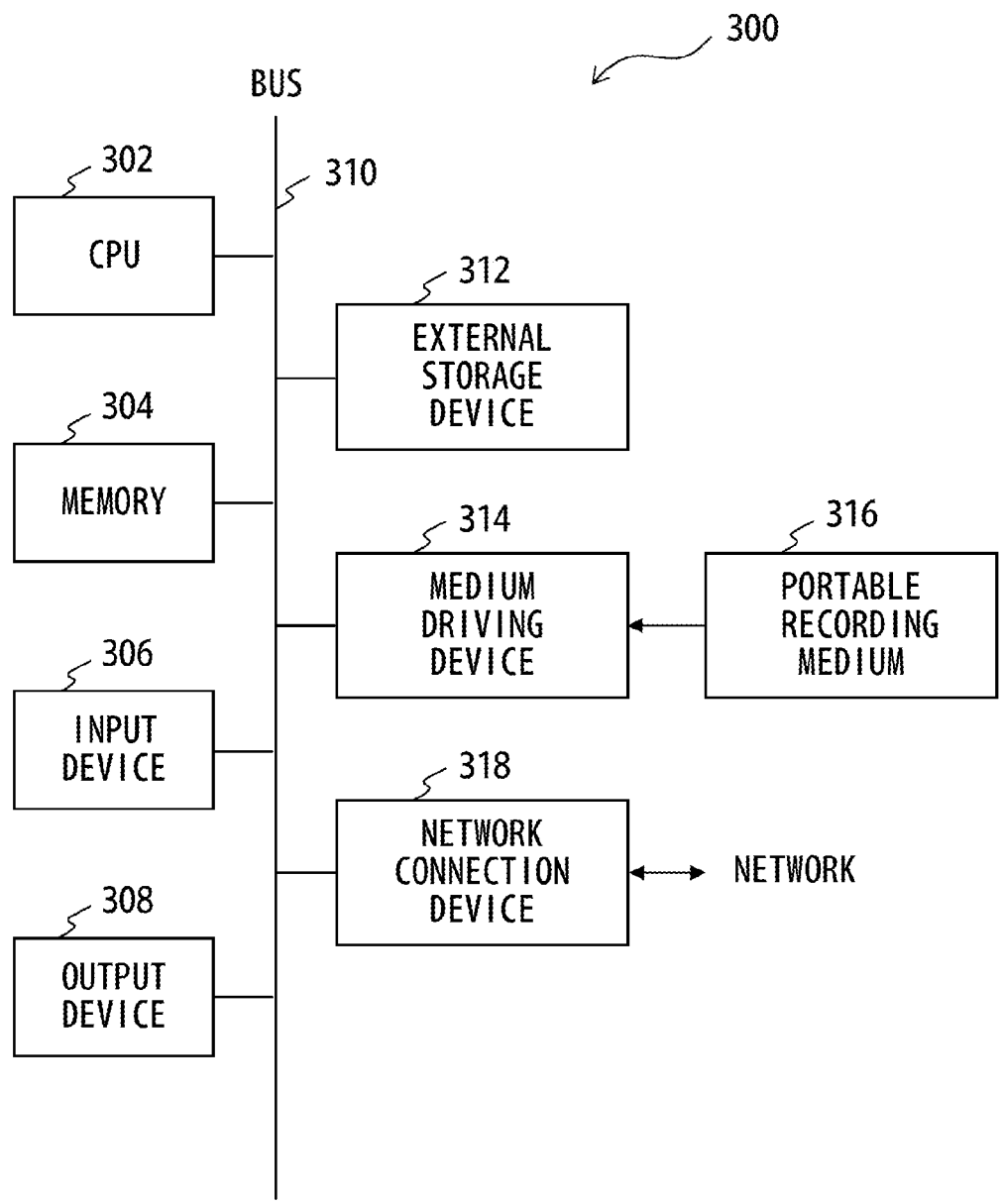
F I G. 18

IMAGE MATCHING METHOD AND IMAGE PROCESSING SYSTEM

CROSS-REFERENCE TO RELATED APPLICATION

This application is based upon and claims the benefit of priority of the prior Japanese Patent Application No. 2014-009859, filed on Jan. 22, 2014, the entire contents of which are incorporated herein by reference.

FIELD

The embodiments discussed herein are related to an image matching method and an image processing system.

BACKGROUND

A widely used technique for matching images uses feature points that are obtained from the images, and examples of the technique include an image retrieval that uses an image as a query, and creation of a panoramic image that is performed by image composition. For example, there is a method for determining a coordinate transformation coefficient for performing a coordinate transformation process so that the coordinates of a feature point of one image from among two images agree with the coordinates of a feature point of the other image. A method is also known for determining that spoofing has been attempted in a case in which an error between conversion coordinates that are obtained by executing a planar projective transformation of an image from a first image to a second image and feature point coordinates in the second image is not more than a fixed value with respect to the first and second images that are obtained by photographing an object that is an inspection target from angles different from each other. A linear transformation matrix calculation device and an image retrieval that is used for fingerprint matching are also known. The linear transformation matrix calculation device can obtain a linear transformation matrix that reduces the similarity between partial spaces that belong to the same category while increasing the similarity between partial spaces that belong to different categories. A method for recognizing a plurality of advertisement signs in a video is also known, and the method can separate a corresponding point of an individual recognition target from a correspondence result that includes an error correspondence and mixed corresponding points obtained by using a local constant feature amount, and performs recognition on the basis of the corresponding point. At that time, deformation that is unlikely to occur as a result of changes in a viewpoint position and an attitude of a recognition target is eliminated (For example, see patent documents 1-5).

An example of a projective transformation matrix estimation method between two images, which is used for image matching, is Random Sample Consensus (RANSAC) (For example, see non-patent document 1). In addition, a method for limiting a selection range of m feature point pairs by using clustering is known (For example, see non-patent document 2). A method for performing reliable matching in images that are obtained by photographing different scenes etc., is also known (for example, see non-patent document 3).

[Patent Document 1] Japanese Laid-open Patent Publication No. 2010-272091

[Patent Document 2] International Publication Pamphlet No. WO 2010/050206

[Patent Document 3] Japanese National Publication of International Patent Application No. 2008-529156

[Patent Document 4] Japanese Laid-open Patent Publication No. 2010-182013

[Patent Document 5] Japanese Laid-open Patent Publication No. 2007-140613

[Non-Patent Document 1] Fischler, M. A. and Bolles, R. C. "Random sample consensus: A paradigm for model fitting with applications to image analysis and automated cartography, " *Communications of the ACM,* 24(6) :381-395, 1981.

[Non-Patent Document 2] Kai Ni, Hailin Jin, and Frank Dellaert, *GroupSAC: Efficient Consensus in the Presence of Groupings, IEEE International Conference on Computer Vision* (ICCV), 2009.

[Non-Patent Document 3] Lowe, G. David, "Distinctive image features from scale-invariant keypoints," *International Journal of Computer Vision,* 60, 2 (2004), pp. 91-110.

SUMMARY

According to an aspect of the embodiments, an image matching method comprises creating first pair candidates that include a plurality of feature point pairs each of which includes a first feature point of a first image and a second feature point of a second image that correspond to each other from a plurality of feature points that are extracted from the first image and the second image, by a processor, determining a first feature point pair to be deleted from the first pair candidates on the basis of a result of comparison between a predetermined angle and an angle between a first vector that connects a first feature point of the first feature point pair and a first feature point of a second feature point pair, and a second vector that connects a second feature point of the first feature point pair and a second feature point of the second feature point pair, with respect to the one or more second feature point pairs for the first feature point pair from among the created first pair candidates,by the processor, and performing matching between the first image and the second image on the basis of the feature point pairs that are included in second pair candidates that are obtained by excluding the first feature point pair that is determined to have been deleted from the first pair candidates, by the processor.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is a diagram illustrating an example of pair determination.

FIG. 6 is a diagram explaining the method for determining a set in pair determination.

FIG. 9 is a diagram illustrating an example of a matrix estimation table.

FIG. 10 is a flowchart explaining operations of the image processing system.

FIG. 11 is a flowchart illustrating an example of a pair determination process.

FIG. 12 is a flowchart illustrating an example of a matrix estimation process.

FIG. 13 is a diagram explaining a pair selection process according to a first modification.

FIG. 17 is a flowchart illustrating one example of a set selection process according to a third modification.

FIG. 18 is a diagram illustrating one example of a hardware configuration of a standard computer.

DESCRIPTION OF EMBODIMENTS

When a photographed image is used in matching of images, etc., there are cases in which the number of wrong feature point pairs (outliers) increases in a feature point pair candidate group, because much noise of, such as a background, masking, reflection of light, and shadows, is included in the photographed image. When the ratio of outliers in the pair candidate group increases, the probability that all the feature point pairs are correct pairs (inliers) decreases. Thus, there are problems in which even if a plurality of matrix calculations for estimating a transformation matrix between images that are targets to be matched are performed, the matrix cannot be calculated, and estimation accuracy deteriorates.

(One Embodiment)

Figure 1:
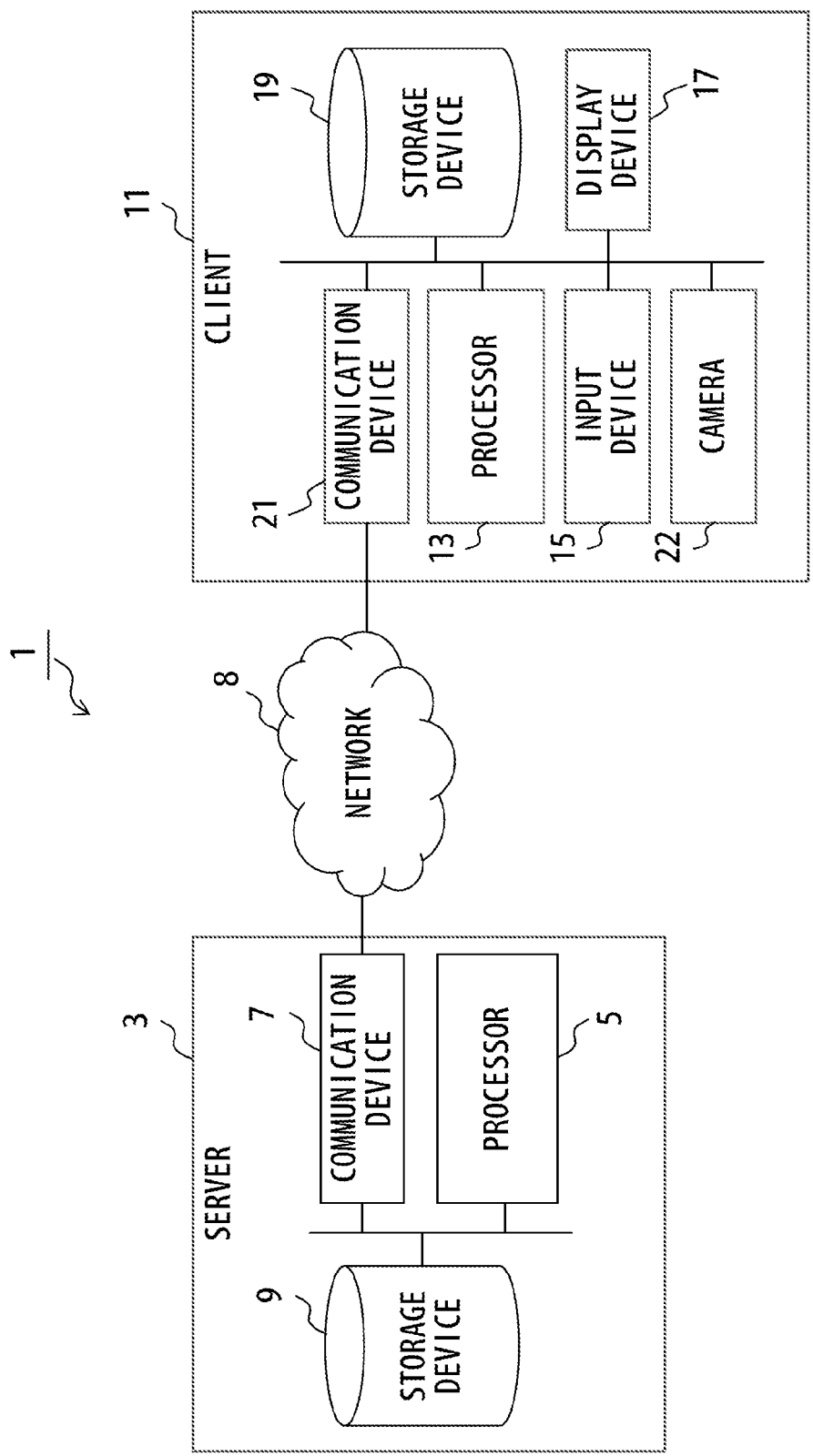
FIG. 1 is a diagram illustrating an example of the configuration of an image processing system.

Hereinafter, an image processing system 1 according to one embodiment will be described with reference to the drawings. FIG. 1 is a diagram illustrating one example of the configuration of the image processing system 1 according to this embodiment. As illustrated in FIG. 1, the image processing system 1 is a system in which a server 3 and a client 11 are connected to each other via a network 8. The server 3 is an information processing device such as a standard computer. The network 8 is a wired or wireless communication network. The client 11 is, for example, a multifunctional cell phone or a personal digital assistant.

The server 3 includes an processor 5, a communication device 7, and a storage device 9. The processor 5 is a processor such as a central processing unit (CPU) that executes an arithmetic process in the server 3. The processor 5 executes an arithmetic process necessary for the operation of the server 3 by reading and executing a program that is stored in, for example, the storage device 9. The communication device 7 is a device that transmits and receives information to and from the outside via the network 8, and includes an antenna, a transmission and reception circuit, etc. The storage device 9 is a storage device that stores the program for controlling the operation of the server 3, and information etc. necessary for a process. The storage device 9 may include, for example, a semiconductor storage device and an external storage device, and may store a plurality of pieces of image information, or information that includes feature points and feature amounts of an image.

The client 11 includes an processor 13, an input device 15, a display device 17, a storage device 19, a communication device 21, and a camera 22. The processor 13 is a processor that controls the operation of the client 11 by reading and executing the program that is stored in, for example, the storage device 19. The input device 15 is a device for inputting a process etc. to the client 11, and examples of the input device include a keyboard device, a touch panel, and a microphone. The display device 17 is a device that displays information, and examples of the display device include a liquid crystal display device. The communication device 21 is a device that transmits and receives information via the network 8, and includes an antenna, a transmission and reception circuit, etc. The camera 22 is a device that photographs an image.

In the image processing system 1, a first image that is photographed by, for example, the client 11 is transmitted to the server 3 via the network 8, and the server 3 executes a matching process between the first image and a second image that is read out from the storage device 9.

Figure 2:
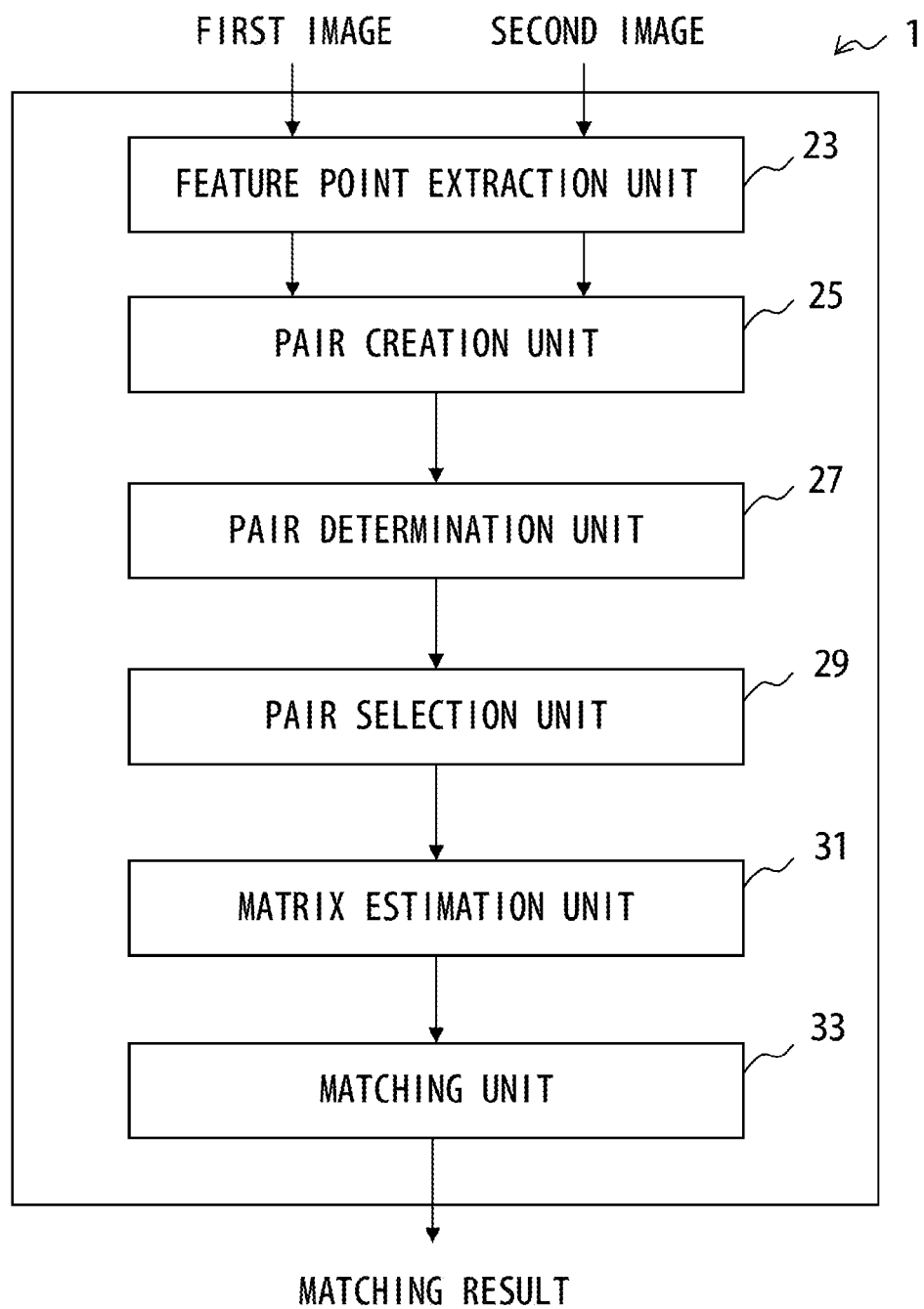
FIG. 2 is a block diagram illustrating an example of the function of the image processing system.

FIG. 2 is a block diagram illustrating an example of the function of the image processing system 1 according to this embodiment. As illustrated in FIG. 2, the image processing system 1 includes a feature point extraction unit 23, a pair creation unit 25, a pair determination unit 27, a pair selection unit 29, a matrix estimation unit 31, and a matching unit 33.

The feature point extraction unit 23 extracts feature points and a feature amount in each feature point from the first image and the second image that are targets to be matched. At that time, for example, the feature point extraction unit 23 may extract the feature points and the feature amounts of the first image at the client 11, and may extract the feature points and the feature amounts of the second image at a server 3 side by reading out the second image from the storage device 19. At that time, the server 3 may receive the feature points and the feature amounts of the first image from the client 11 via the network 8.

As a feature point, a prominent portion that is repeatedly requested from the same image, such as a corner in an image, is used. As a feature amount that represents a feature point, for example, a rotational invariant feature is used. For example, as a feature point and a feature amount, Scal-Invariant Feature Transform (SIFT) and Spread-Up Robust Features (SURF) that are described in non-patent document 3 can be used. However, a feature amount may not be rotationally invariant when the rotational angle may be determined to be small in a positional relationship between two images according to the positional relationship of a photographing device with respect to a target to be photographed between the two images, which can be assumed in advance.

The pair creation unit 25 creates a first feature point and a second feature point that correspond to each other as a feature point pair, on the basis of feature points and feature amounts that are extracted from the first image and the second image. A pair will be created, for example, by associating with each other feature points of the first image and the second image having a high degree of similarity in their feature amounts. For example, when a SIFT feature is used, the distance of the feature amounts between the feature point of the first image and the feature point of the second image is calculated, and a combination of feature points that have the smallest distance of the feature amounts are associated as a feature point pair. The pair creation unit 25 creates a plurality of feature point pairs, and causes the storage device 9 to store coordinate positions of feature points in each image as first pair candidates. At that time, the pair creation unit 25 may cause a pair candidate table 140 that will be described hereinafter to store feature point pairs.

The pair determination unit 27 determines whether or not each feature point pair that is included in the first pair candidates that are created in the pair creation unit 25 is appropriate to be used, in order to estimate a matrix for matching the first image and the second image. For example, the pair determination unit 27 selects a first feature point pair from the first pair candidates. Then the pair determination unit 27 selects a second feature point pair that is different from the first feature point pair from the first pair candidates, and determines whether or not the pair is appropriate, on the basis of the angle (hereinafter referred to as a determination angle) between vectors that are formed by connecting feature points of the first feature point pair and the second feature point pair which exist in each image. That is, the first vector is a vector that connects the first feature point of the first image of the first feature point pair and the first feature point of the first image of the second feature point pair. The second vector is a vector that connects the second feature point of the second image of the first feature point pair and the second feature point of the second image of the second feature point pair. At that time, the determination angle is an angle between the first vector and the second vector.

As for concrete determination, for example, if the ratio of the second feature point pairs whose determination angles are not larger than a predetermined angle to the second feature point pairs whose determination angles are calculated is a predetermined value or greater, the first feature point pair is determined to be a feature point pair that is appropriate for calculating a matrix. The pair determination unit 27 deletes the first feature point pair that is not determined to be appropriate from the first pair candidates. The first pair candidates after deletion are referred to as second pair candidates. The determination angle can be defined as an angle of from 0 to 180 degrees between the first vector and the second vector which connect the feature points of two target feature point pairs on each image.

The pair selection unit 29 selects, for example, at random, a predetermined finite number that is equal to or greater than two (m: m is an integer not less than two) of feature point pairs from the second pair candidates. The matrix estimation unit 31 calculates a transformation matrix that represents a relationship between the first image and the second image on the basis of the m feature point pairs. A process for estimating a transformation matrix between the first image and the second image maybe executed while removing noise, by using Random Sample Consensus (RANSAC), which is a robust estimation method and is described in non-patent document 1. Concretely, on the basis of the coordinates of m corresponding feature point pairs, the transformation matrix (rotational transformation, similarity transformation, parallel translation: m=2, affine transformation: m=3, projective transformation: m=4) between the two images is determined. In addition, the matrix estimation unit 31 determines an evaluation value that represents a plausibility of the matrix, by using, for example, the feature point pairs other than the m feature point pairs of the second pair candidates.

The matching unit 33 matches the first image and the second image on the basis of the calculated evaluation value. For example, when the evaluation value is larger than a predetermined value, it may be determined that a plausible matrix has been estimated, and it may be determined that the first image and the second image agree with each other.

Figure 3:
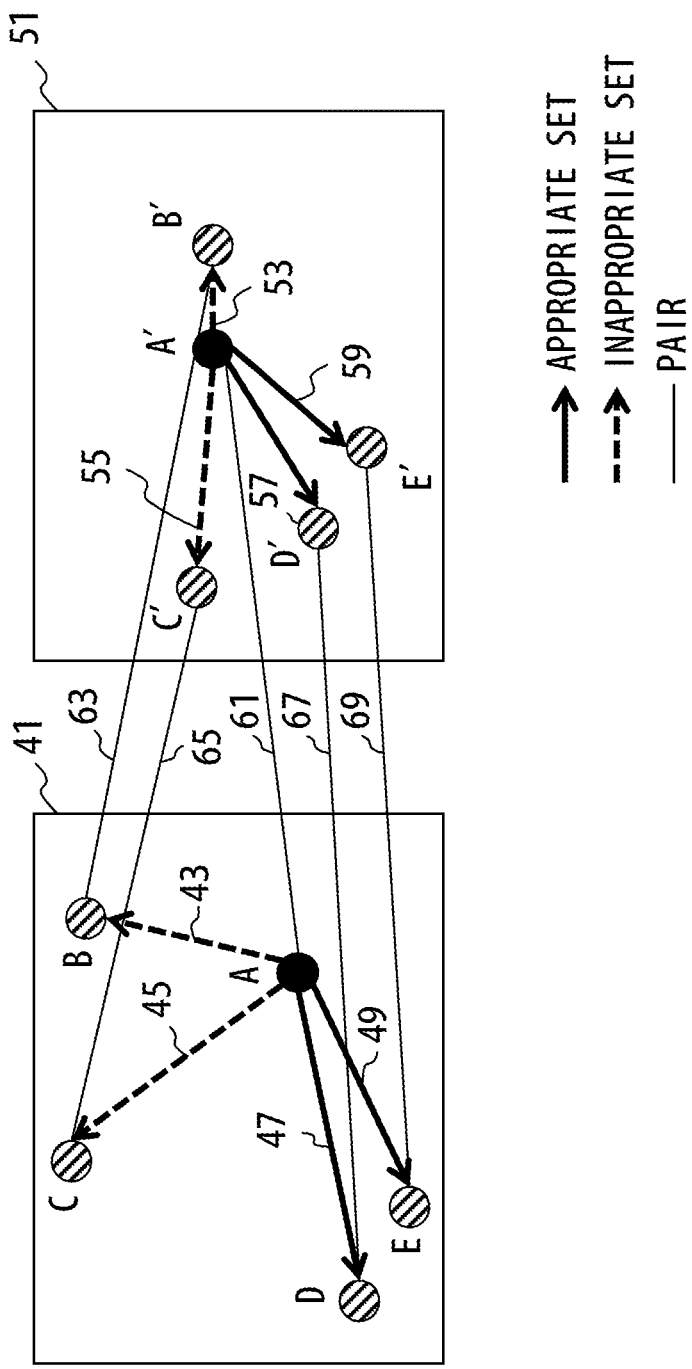
FIG. 3 is a diagram illustrating an example of pair determination.

FIGS. 3 and 4 are each a diagram illustrating an example of pair determination according to this embodiment. In FIGS. 3 and 4, feature points A-D in the first image and feature points A'-D' in the second image are illustrated.

As illustrated in FIG. 3, the feature point A in the first image and the feature point A' in the second image are illustrated as a pair 61. Similarly, in this example, pairs 63-69 are illustrated. At that time, it is assumed that the first feature point in the first image is the feature point A, and the second feature points in the first image are feature points B-E. For example, when a first vector is a vector AB, and a second vector is a vector A'B', the pair determination unit 27 determines whether or not the determination angle between the first vector and the second vector is larger than a predetermined angle. Similarly, the determination angle between a vector AC and a vector A'C', the determination angle between a vector AD and a vector A'D', and the determination angle between a vector AE and a vector A'E' are determined, respectively.

In the example of FIG. 3, with respect to the combination of a vector 43 and a vector 53, and the combination of a vector 45 and a vector 55, the determination angle between the vectors is larger than a determined angle. Therefore, the corresponding combination (referred to as a set) of the feature point pair AA' and the feature point pair BB', and the corresponding set of the feature point pair AA' and the feature point pair CC' are inappropriate sets of feature point pairs. In addition, the combination of a vector 47 and a vector 57, and the combination of a vector 49 and a vector 59 are appropriate sets of feature point pairs (the set of the feature point pair AA' and the feature point pair DD' and the set of the feature point pair AA' and the feature point pair EE'). In this example, the two sets from among the four sets are appropriate. Therefore, the ratio of the appropriate sets is 50%. At this time, if a predetermined threshold value is less than 50%, the feature point pair AA' that is the first feature point pair is determined to be an appropriate feature point pair (inlier).

FIG. 4 illustrates that all the sets that correspond to the combinations of the vectors 73 to 79 and the vectors 83 to 89 are inappropriate sets. Since the threshold value is considered to be over 0%, the feature point pair AA' is determined to be an inappropriate feature point pair (outlier) in this case.

Figure 5:
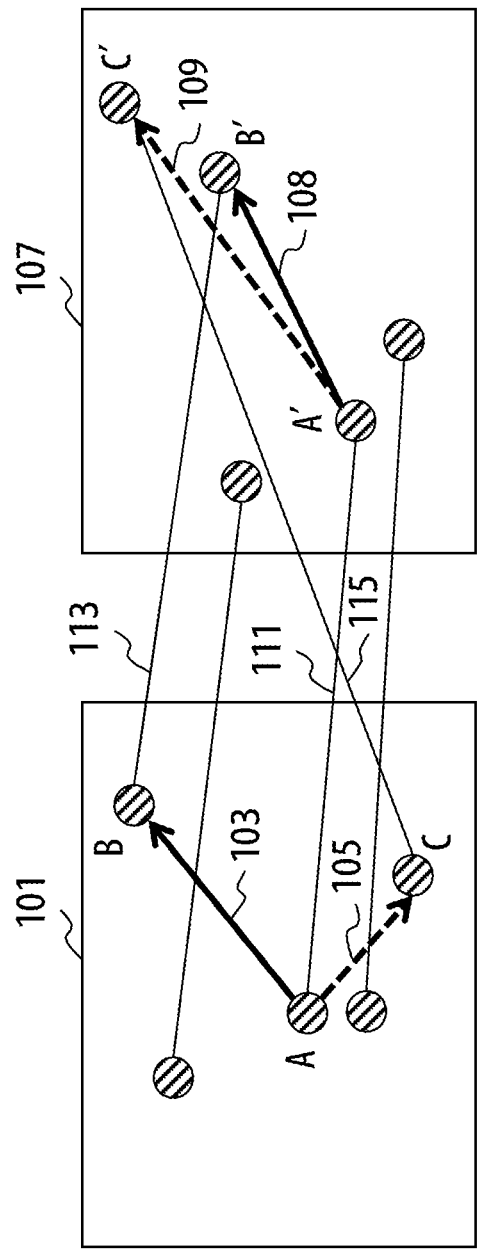
FIG. 5 is a diagram explaining a method for determining a set in pair determination.

FIGS. 5 and 6 are each a diagram for further explaining a method for determining a set in the above pair determination. As illustrated in FIG. 5, the feature point pair AA' (pair 111) is selected as the first feature point pair, and the feature point pairs BB' and CC' (pairs 113 and 115) are selected as the second feature point pairs. At that time, as illustrated in FIG. 6, with respect to the second feature point pair BB', $\theta_{AB}$ between the vector AB (vector 103) and the vector A'B' (vector 108) is not larger than a predetermined threshold value $\theta$th, for example. As a result, the set of the feature point pair AA' and the feature point pair BB' is determined to be appropriate. On the other hand, with respect to the second feature point CC', the angle $\theta_{AC}$ between the vector AC (vector 105) and the vector A'C' (vector 109) is larger than the predetermined threshold value $\theta$th, for example. As a result, the set of the feature point pair AA' and the feature point pair CC' is determined to be inappropriate.

Figure 7:
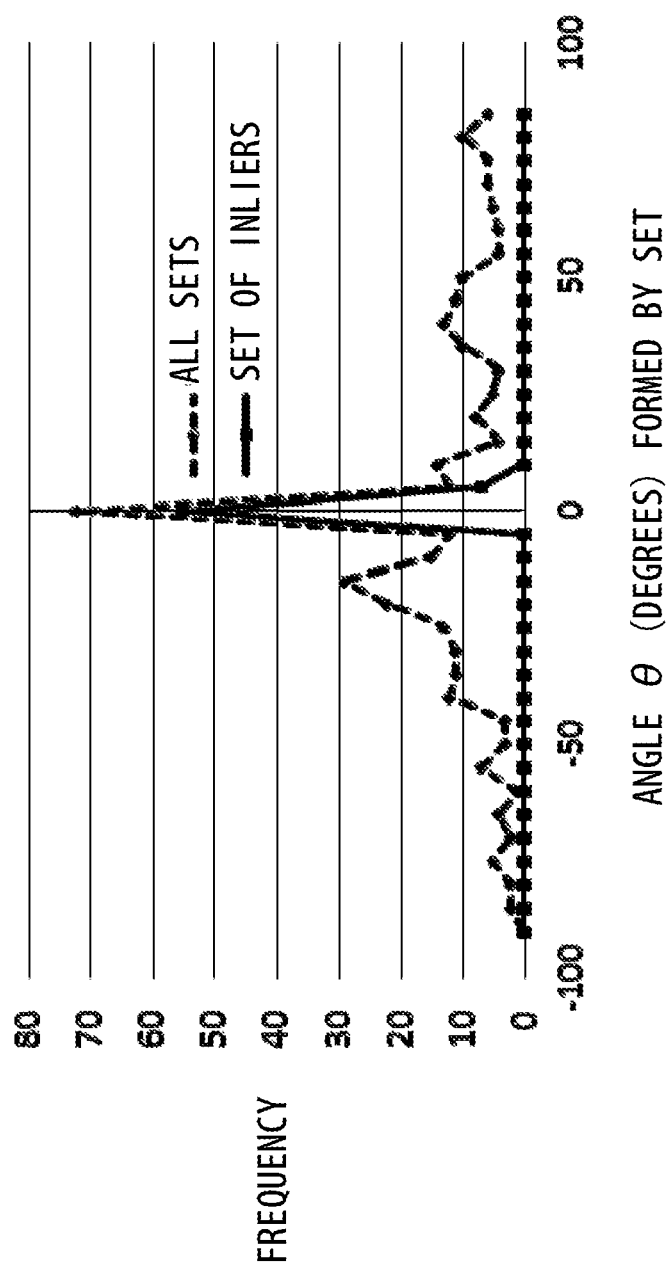
FIG. 7 is a diagram illustrating an example of an effect of pair determination.

FIG. 7 is a diagram illustrating an example of an effect of pair determination. Since pair determination is performed as described above, there is a difference between the distribution of the angles formed by sets of the first pair candidates before determination and the distribution of the angles formed by sets of the feature point pairs that are determined to be appropriate in pair determination. In FIG. 7, determination angles in sets that are selected from all the feature pairs before determination and determination angles in sets that are selected from the feature point pairs that are determined to be appropriate are illustrated, with angle as the horizontal axis and frequency as the vertical axis. In FIG. 7, for convenience of explanation, angles in the horizontal axis are represented so that angles in one direction with respect to, for example, the first vector, are indicated as positive angles, and angles in the other direction are represented as negative angles. As illustrated in FIG. 7, determination angles θ of sets of feature point pairs (inliers) that are determined to be appropriate obviously concentrate near zero degrees.

Figure 8:
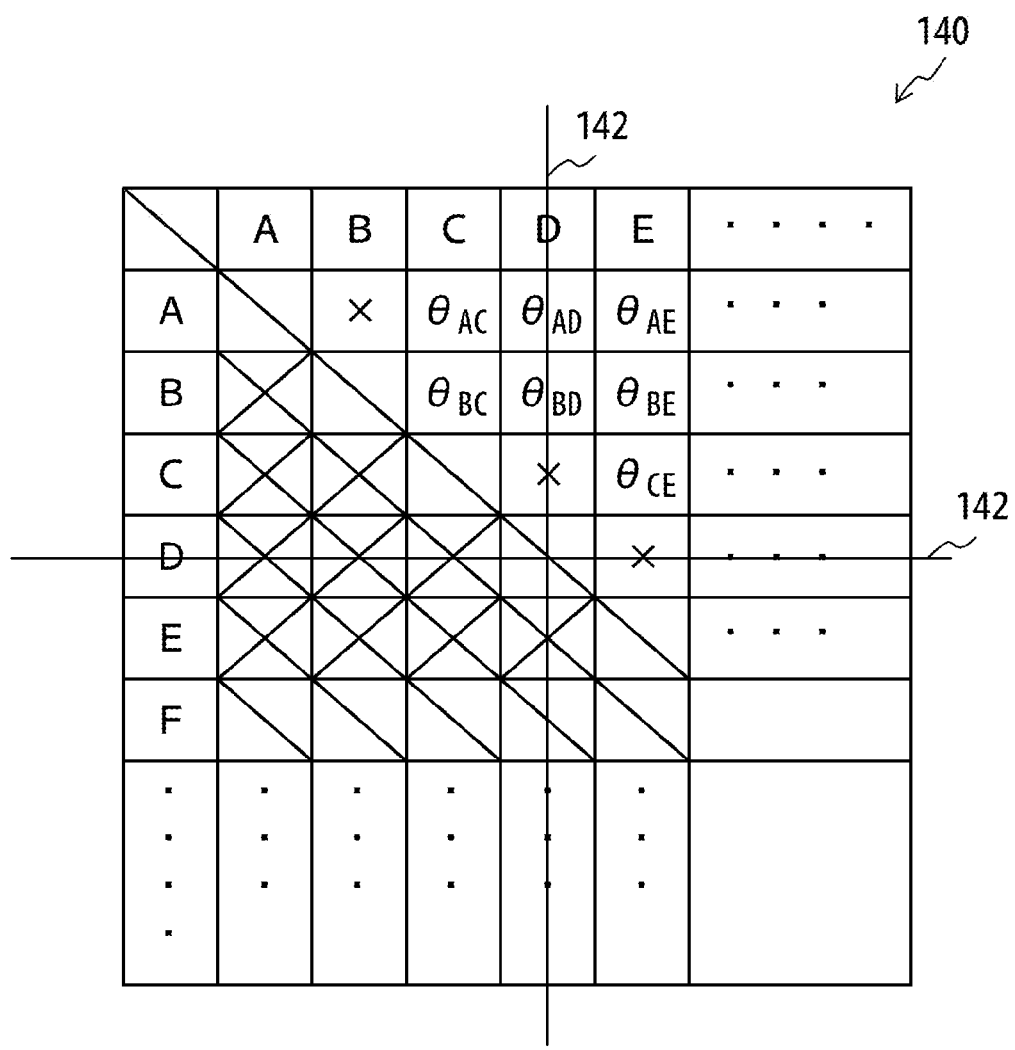
FIG. 8 is a diagram illustrating an example of a pair candidate table.

FIG. 8 is a diagram illustrating an example of the pair candidate table 140. As illustrated in FIG. 8, the pair candidate table 140 represents, in a matrix, feature point pairs that are extracted by the feature point extraction unit 23, the feature point pairs being represented by the names of feature points in the first image. In this example, feature points of respective rows (that are arrayed vertically) represent first feature point pairs, and feature points of respective columns (that are arrayed horizontally) represent second feature point pairs.

For example, the pair candidate table 140 represents that when the first feature point is A and the second feature point is C, the determination angle is the angle $θ_{AC}$, which is not larger than the predetermined angle θth. For example, the pair candidate table 140 represents with the mark "×" that when the first feature point is A and the second feature point is B, the determination angle is larger than the predetermined angle θth. A strike-through 142 represents that with respect to a certain feature point pair, when the ratio of sets whose determination angles exceed the angle θth exceeds a predetermined value, a corresponding feature point pair is an inappropriate feature point pair. Feature point pairs without the strike through 142 from among feature point pairs in the pair candidate table 140 become second pair candidates.

Figure 9:
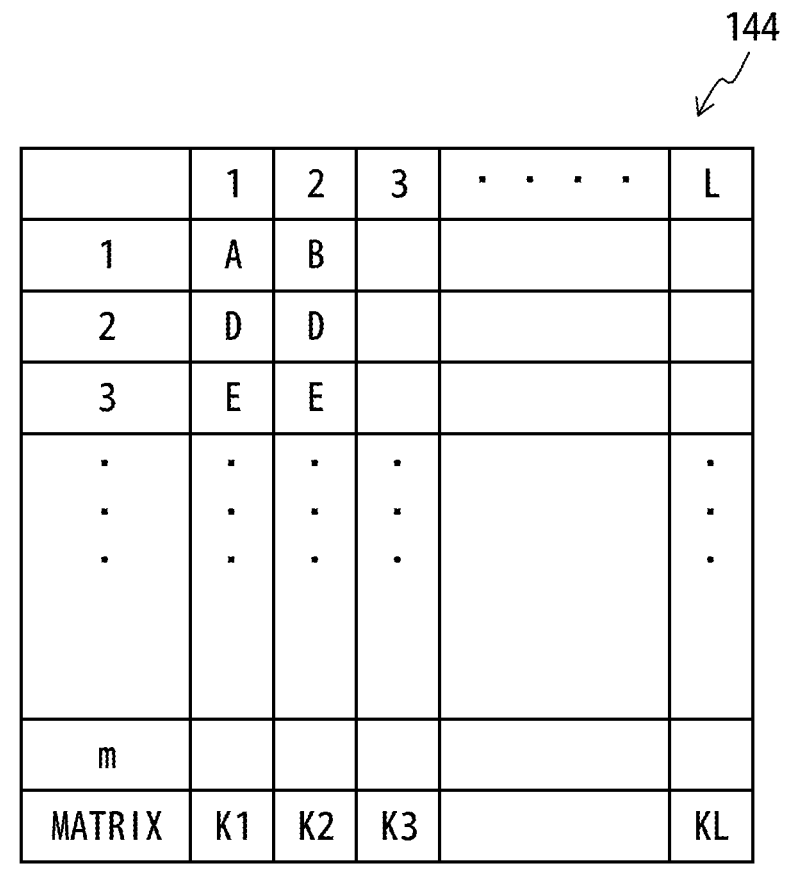

FIG. 9 is a diagram illustrating an example of a matrix estimation table. As illustrated in FIG. 9, the integer m (m is an integer of two or more) indicates the number of feature point pairs that are included in each third pair candidate, and the integer L (L is an integer of one or more) indicates the number of groups of the third pair candidates. The example of FIG. 9 illustrates that matrixes K1 to KL (L=1 to L) are estimated from L groups of m feature point pairs.

Hereinafter, processes of the image processing system 1 will be described with reference to FIGS. 10-12. Hereinafter, a case will be described in which the client 11 transmits an acquired image to the server 3, and a feature amount is extracts at the server 3. The following processes are executed by the reading and executing of a predetermined program by the processor 5 of the server 3 or the processor 13 of the client 11. The processes will be described assuming that the processes are executed by each unit that is illustrated in FIG. 2.

FIG. 10 is a flowchart explaining operations of the image processing system 1 according to this embodiment. As illustrated in FIG. 10, the feature point extraction unit 23 extracts a feature point (S151) and a feature amount (S152) with respect to each of the first image and the second image. The pair creation unit 25 creates feature points that correspond to each other as a feature point pair on the basis of the coordinates of the extracted feature points and the feature amounts (S153). At that time, it is preferable to store the created feature points as first pair candidates in the pair candidate table 140. In addition, the pair creation unit 25 determines whether or not the number of created feature point pairs is not less than a predetermined number (m) necessary for estimating a matrix, and when the number is less than m, determines that the feature point pairs have been rejected (YES in S154) since a matrix cannot be calculated, and returns the process to S151. When m or more feature point pairs are extracted (NO in S154), the pair determination unit 27 determines whether or not the extracted first pair candidates are appropriate (S155). Details of pair determination will be described hereinafter.

The pair selection unit 29 extracts, for example, at random, m feature point pairs from among second pair candidates that are determined to be appropriate in S155. The matrix estimation unit 31 calculates a transformation matrix between the first image and the second image, and calculates an evaluation value with respect to the calculated transformation matrix on the basis of the extracted feature point pairs (S156). At that time, the matrix estimation unit 31 may set the matrix calculated to have the highest evaluation value as a transformation matrix between the two images. Details of matrix estimation will be described hereinafter. The matching unit 33 matches the first image and the second image on the basis of the calculated evaluation value (S157). At that time, the matching unit 33 may also determine the degree of matching between the two images on the basis of, for example, whether or not the highest evaluation value exceeds a predetermined threshold value.

FIG. 11 is a flowchart illustrating an example of a pair determination process according to this embodiment. The pair determination process is a process in S155 in FIG. 10. As illustrated in FIG. 11, the pair determination unit 27 determines whether or not there is a first feature point pair that has not yet been determined, and when there is not (NO in S191), the process is returned to that in FIG. 10, and the process continues. In the case where there is a first feature point pair that has not yet been determined (YES in S191), the pair determination unit 27 selects one feature point pair as a first feature point pair from first pair candidates (S192). The pair determination unit 27 initialized an appropriate set number s=0 (s is an integer not less than zero) and a trial number n=0 (n is an integer not less than zero) (S193). The appropriate set number s is a number of groups (sets) of feature point pairs that are determined to be appropriate on the basis of set determination that will be described hereinafter. The trial number n is a trial number of set determination processes.

The pair determination unit 27 selects one feature point pair other than the first feature point pair as a second feature point pair from the first pair candidates (S194). The pair determination unit 27 calculates a determination angle θ (for example, the angle between the first vector AB and the second vector A'B') in the same manner as described above, with respect to the selected first feature point pair and the selected second feature point pair, and determines whether or not the determination angle θ is larger than a threshold value θth (step 195). For example, at this time, the determination angle θ can be 0 to 180 degrees. In addition, since a positivity or negativity of an angle is uniquely determined, a vector maybe determined with reference to, for example, a feature point near the origin (a point A in FIG. 5) in the first image as a reference (an image 101 in FIG. 5). At this time, for example, the range of the determination angle θ can be from −180 degrees to 180 degrees. The pair determination unit 27 may determine whether or not the absolute value of the determination angle θ has a larger absolute value than the threshold value θth.

Here, when it can be assumed in advance that an angle between the images that corresponds to a positional relationship between a target to be photographed and a photographing device when images are photographed (hereinafter referred to as an angle between images) is within a fixed value, the determination angle θ falls within a fixed range (for example, 0 to θth, or −θth to θth). Therefore, when |θ|>θth, at least one feature point pair from among two feature point pairs that are included in a set will prove to be an outlier. As a result, in S195, the pair determination unit 27 determines that a set is appropriate if |θ|≤θth, and that a set is inappropriate if |θ|>θth.

That is, when the absolute value of the determination angle θ is not more than the threshold value θth (NO in S195), the pair determination unit 27 determines that the set of the selected first feature point pair and the selected second feature point pair is appropriate, and sets s=s+1 (S196). In addition, the pair determination unit 27 stores the determination angle θ at that time (referred to as $θ_{AB}$) in the pair candidate table 140. In set determination, for example, it may be determined that a set is appropriate if |θ|<θth, and that a set is inappropriate if |θ|>th.

For example, when the absolute value of the determination angle θ is larger than the threshold value θth (YES in S195), the pair determination unit 27 determines that the set of the selected first feature point pair and the selected second feature point pair is inappropriate. In addition, the pair determination unit 27 stores the fact that the set is inappropriate with a mark such as "×" in a corresponding box in the pair candidate table 140 (S198).

The pair determination unit 27 sets n=n+1 (S199), and returns to S194 and repeats the process during the period in which trial number n is less than a threshold value nth (NO in S200). When the trial number n is not less than the threshold value nth (YES in S200), the pair determination unit 27 determines whether or not s<m×n/N (N is the number of first pair candidates) is satisfied (S201).

When s<m×n/N is not satisfied (NO in S201), the pair determination unit 27 returns to S191 and repeats the process. When s<m×n/N is satisfied (YES in S201), the pair determination unit 27 determines that the first feature point pair is an outlier (S202). In addition, the pair determination unit 27 deletes the first feature point pair from the first pair candidates (S203), for example, by using the strike through 142 in the pair candidate table 140, and returns the process to S191.

Here, a method for determining a threshold value θth will be described. The range of the angle between two images is assumed in advance from a use method, and the images are set to be rotated at a maximum of x, y, z degrees around three axes perpendicular to one another with the center point of a target to be matched as an origin. In addition, it is possible to set x, y, and z dynamically by acquiring a tilt of a photographing apparatus such as a camera. On the basis of the rotation angles x, y and z of the images that are set in this manner, coordinates of four corners of a quadrangle are subjected to rotational/perspective projective transformation. Two pairs of coordinates before and after transformation are combined to determine a set and an angle formed by the set. The maximum angle from among the angles of a plurality of sets that are determined by changing combinations is set to be the threshold value θth.

For example, when coordinates (h, v) on a plane image are rotated at assumed angles of x, y, and Z by using a roll-pitch-yaw rotation matrix of the following formula 1, the coordinates are transformed into coordinates (X, Y, Z) in a three dimensional space. Coordinates obtained by transforming the coordinates with the following formula 2 on a two-dimensional plane are set as (h',V'). Here, F is a distance from a viewpoint and an optional value.

A determination angle θ between a first vector and a second vector which each connect coordinates on each image is determined by using two groups of coordinates before and after transformation. The largest value of determination angles θ that are obtained from a plurality of coordinates is set as a threshold value θth.

A threshold value nth can be determined, for example, by the following formula 3.

$$nth = \frac{N}{\left(\frac{\varepsilon}{\mu(\alpha)}\right)^2 \times \frac{N-1}{P(1-P)} + 1}$$ [Formula 3]

Here, the ratio P is an expected population rate (a ratio of targets that satisfy a condition in a population). In a case in which it is difficult to estimate the ratio P in advance, P=0.5 (=50%) may be set, for example.

ε is a value of a ratio that is acceptable as a difference between a ratio at which a second feature point pair that is appropriate for the second feature point pair is selected, and a ratio of appropriate feature point pairs to the first pair candidates, when set determination is tried nth times.

μ(α) is a value that is determined by a degree of reliability (100−α). When the degree of reliability is set to be 95%, μ(α)=1.96, and when the degree of reliability is set to be 99%, μ(α)=2.58. For example, when the degree of reliability is 95%, the ratio of selecting an appropriate feature point pair when set determination is tried nth times falls within the range of (the average value of the ratio of appropriate feature point pairs (a value obtained by a trial)−ε×1.96) to (the average value of the ratio of appropriate feature point pairs+ε×1.96) with a probability of 95%.

FIG. 12 is a flowchart illustrating one example of a matrix estimation process according to this embodiment. The matrix estimation process is a process in S156 in FIG. 10. As illustrated in FIG. 12, the pair selection unit 29 refers to the pair candidate table 140, and inputs second pair candidates that are determined to be appropriate (feature point pairs that are not deleted) (S221). When the number of second candidates is less than m, the pair selection unit 29 determines to reject the second pair candidates because a matrix cannot be estimated, terminates the process, and returns the process to that in FIG. 19 (YES in S222).

When the number of second pair candidates is not less than m (NO in S222), the pair selection unit 29 sets trial number l=0 (S223), and selects m feature point pairs from the second pair candidates (S224). At that time, the pair selection unit 29 can select at random m feature point pairs (referred to as third pair candidates) that do not overlap with each other, from the second pair candidates.

rotation matrix = [Formula 1]

$$\begin{pmatrix} \cos(y)*\cos(z) & -\cos(y)*\sin(z) & \sin(y) \\ \cos(x)*\sin(z) + \sin(x)*\sin(y)*\cos(z) & \cos(x)*\cos(z) - \sin(x)*\sin(y)*\sin(z) & -\sin(x)*\cos(y) \\ \sin(x)*\sin(z) - \cos(x)*\sin(y)*\cos(z) & \sin(x)*\cos(z) + \cos(x)*\sin(y)*\sin(z) & \cos(x)*\cos(y) \end{pmatrix}$$

$h' = F \times X/(F+Z)$ [Formula 2]

$y' = F \times Y/(F+Z)$

The matrix estimation unit 31 calculates a transformation matrix that represents the relationship between the first image and the second image, on the basis of the third pair candidates that include the selected m feature point pairs (S225). The matrix estimation unit 31 calculates an evaluation value according to the calculated matrix (S226).

In evaluation value calculation, at first, the coordinates of the first feature point in the first image are coordinate-transformed with respect to each feature point pair other than the third pair candidates that are included in the second pair candidates, by using the matrix that is determined in S225. Then, the number of feature point pairs in which the distance between the coordinates after transformation and the coordinates of the corresponding second feature point in the second image are within a threshold value is determined, and the number is set to be an evaluation value.

The matrix estimation unit 31 determines whether or not trial number l is larger than a threshold value Lth (S227), and when the trial number is not larger than Lth (NO in S227), sets l=l+1 (S228), and repeats the processes from S224. When trial number l exceeds the threshold value Lth (YES in S227), the matrix estimation unit 31 determines the matrix with the highest evaluation value calculated from among L evaluation values as a transformation matrix that represents the relationship between the first image and the second image (S229), and returns the process to that in FIG. 10.

Here, the threshold value Lth of the trial number will be described. The threshold value Lth can be an integer of one or more, and can be a value that is expressed with the following formula 4, for example.

$$Lth = \frac{\log(P_{fail})}{\log(1 - P_{inlier}^m)} \quad \text{[Formula 4]}$$

Here, $P_{fail}$ is a probability of not determining a correct matrix at all when Lth trials are performed. The threshold value $P_{th}$ (an acceptable error percentage) of $P_{fail}$ is determined in advance, and an Lth that satisfies $P_{fail} < P_{th}$ is set to be the threshold value of the trial number. $P_{inlier}$ is a probability that a selected feature point pair is an inner, and can be set as an evaluation value/the number of second pair candidates. At that time, the group number L of third pair candidates is an integer not exceeding the threshold value Lth.

As described above, according to the image processing system 1 according to one embodiment, the pair creation unit 25 creates first pair candidates that include a plurality of feature point pairs which are each includes a first feature point of a first image and a second feature point of a second image that correspond to each other. The pair determination unit 27 selects a second feature point pair that is different from the first feature point pair with respect to the first feature point pair, out of the created first pair candidates. The pair determination unit 27 compares a threshold value θth and a determination angle θ between a first vector that connects first feature points of the above first and second feature point pairs in the first image, and a second vector that connects second feature points in the second image. When the ratio of the absolute value of the determination angle θ for the first feature point pair with respect to the plurality of second feature point pairs exceeding the threshold value θth is not less than a predetermined value, the pair determination unit 27 decides to delete the first feature point pair from the first pair candidates. First pair candidates that are not deleted become second pair candidates.

The pair selection unit 29 selects third pair candidates that include a first predetermined number (m) of feature point pairs from the second pair candidates, the first predetermined number (m) being two or more. At that time, the pair selection unit 29 can select L groups, L being one or more, preferably the maximum integer L that does not exceed the threshold value Lth groups of third pair candidates. The matrix estimation unit 31 estimates a matrix that represents the relationship between the first image and the second image, on the basis of the third pair candidates. The matching unit 33 performs matching of the first image and the second image by using an evaluation value based on the result of transformation that is executed by using the estimated matrix and based on the feature point pairs, the evaluation value representing a probability of the matrix.

As described above, according to the image processing system 1 according to the embodiment, it can be determined whether or not to delete a pair candidate according to a determination angle between vectors which each connect feature points in each image of two groups of feature point pairs in the first image and the second image. In the image processing system 1, third pair candidates that are used for matrix estimation are selected from second pair candidates obtained by deleting inappropriate feature point pairs. Therefore, the number of second pair candidates can be reduced, and the number of processes for selecting third pair candidates can be reduced. In addition, since inappropriate feature point pairs are excluded in advance, the ratio of appropriate feature point pairs in the selected m feature point pairs can be increased. As a result, a more probable transformation matrix may be estimated. In addition, since an evaluation value is calculated on the basis of the transformation matrix that is estimated in the above described manner and matching of images is performed, more appropriate image matching is possible.

In the image processing system 1 according to this embodiment, feature point pairs that are inappropriate for matrix estimation can be specified and deleted, and feature point pairs that do not overlap with each other can be selected. In addition, when the number of appropriate feature point pairs is less than a predetermined number m, such as when inversion or torsion is generated in two images, the process is terminated, so that an inappropriate transformation matrix can be prevented from being calculated. In addition, a plurality of groups of feature point pair candidates are selected, and the matrix that has the highest evaluation value can be estimated as a transformation matrix.

On the other hand, when images without vertical and horizontal inversion and torsion are used as first and second images, since it is expected that there will be few feature point pairs that are determined to be inappropriate, more accurate matrix estimation and image matching can be performed. For example, a case of photographing an image from a fixed camera position falls into a case without vertical and horizontal inversion and torsion.

As illustrated in FIG. 7, according to an example of the relationship between angles formed by sets that are determined to be appropriate and their frequencies, in sets that are obtained by combining feature point pairs that are determined to be appropriate, many of the angles that are formed by the sets converge on angles within a fixed range. Therefore, when there is no angle whose frequency is remarkably high and a distribution is uniform, it can be considered that appropriate feature point pairs are not included, and it can be determined to use a reject process. For example, if the maximum frequency when frequencies are normalized is less than a threshold value, rejection can be determined. When the ratio of outliers that are included in first pair candidates is high, the number of repeat processes from S224 to S404 in FIG. 12 increases; however, a process amount can be reduced by terminating the processes using the reject process.

[First Modification]

Hereinafter, a first modification will be described. In the first modification, the same numerals are assigned to the same configurations and operations as those in the image processing system 1 according to the above embodiment, and detailed descriptions thereof will be omitted. This modification is, for example, a modification of the pair selection process in S224 in FIG. 12. In the first modification, the system configuration is the same as that in the image processing system 1.

FIG. 13 is a diagram explaining a pair selection process according to the first modification. In FIG. 13, the frequency W ($\theta$j) is a predicted value of the presence frequency of a set that forms the angle $\theta$j. The total sum Wsum is the total sum of weights of all the sets that are determined to be appropriate (not set to be "×") in the pair candidate table 140, for example. As illustrated in FIG. 7, when determination angles $\theta$ formed by sets and their frequencies are illustrated by a histogram, insets that are obtained by combining inliers, many of the angles that are formed by the sets converge on angles within a fixed range. Therefore, by putting much weight on sets with angles of high frequencies, sets that are obtained by combining inliers will be preferentially selected.

Returning to FIG. 13, when it is assumed that an angle that is formed by a set is $\theta$i, the weight W ($\theta$i) of the set is set as a normal distribution, represented by formula 5. Here, $\theta$m is an angle with the largest frequency, and $\sigma$ is a dispersion of frequencies. At this time, the normal distribution is set as a predicted distribution of determination angles corresponding to sets of appropriate feature point pairs.

$$W(\theta i) = \frac{1}{\sqrt{2\pi}\,\sigma} e^{\frac{(\theta i - \theta m)^2}{2\sigma^2}}$$ [Formula 5]

At this time, the total sum Wsum of weights is expressed with the following formula 6. s is the number of sets of feature point pairs that are determined to be appropriate.

$$Wsum = \sum_{i=0}^{s} W(\theta i)$$ [Formula 6]

Here, when j is an integer that satisfies 0<j<s, it is assumed that a j-th set is included in the range of r of the following formula 7 within the total sum Wsum.

$$\sum_{i=0}^{j-1} W(\theta i) < r \le \sum_{i=0}^{j} W(\theta i)$$ [Formula 7]

Next, by setting the number that is selected at random from the range of 0 to Wsum as r, and determining j that satisfies the above formula 7, the j-th set is selected from candidates that are not considered to be inappropriate in the pair candidate table 140. As a result, a set with a large weight is likely to be selected.

Figure 14:
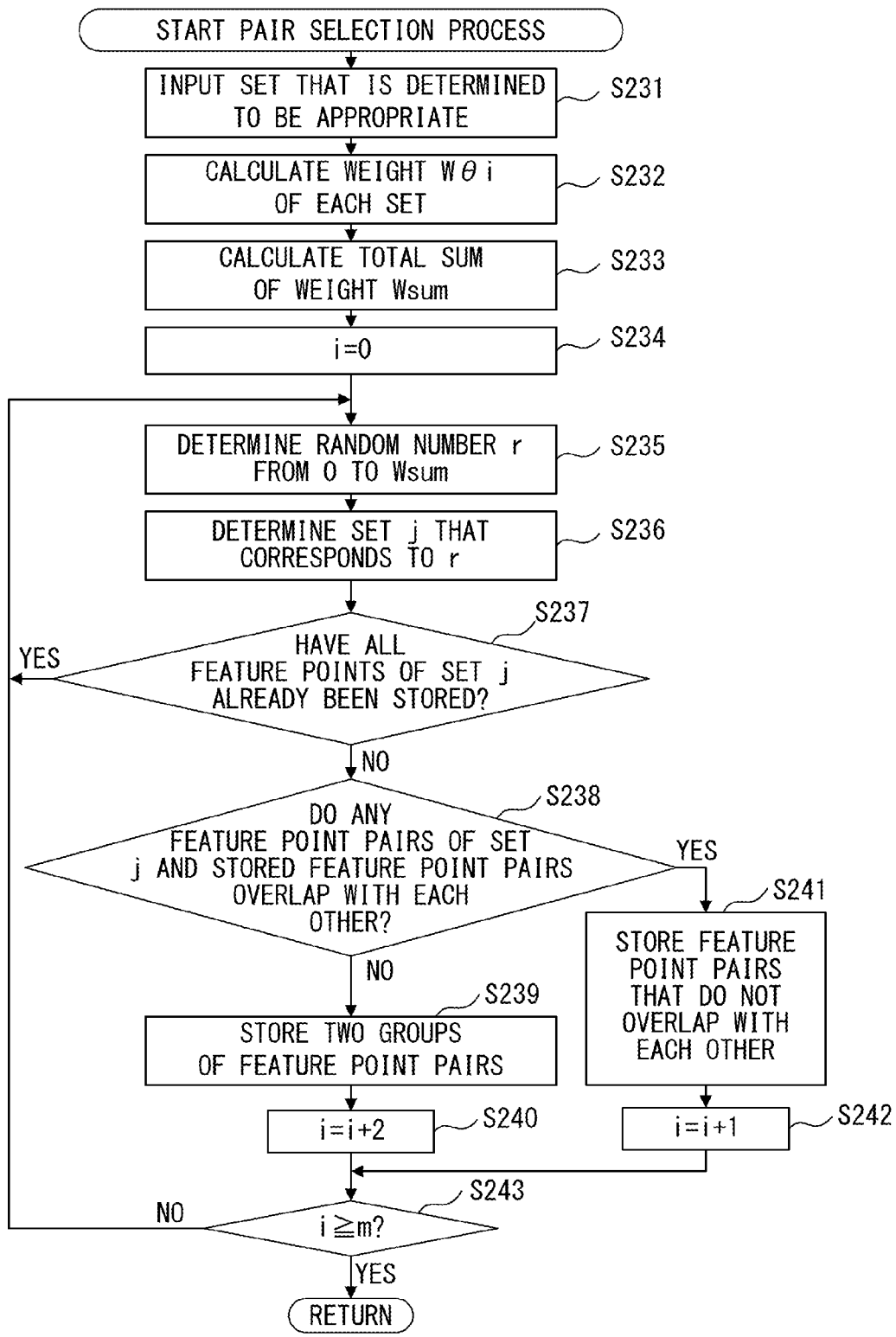
FIG. 14 is a flowchart illustrating one example of the pair selection process according to the first modification.

FIG. 14 is a flowchart illustrating one example of a pair selection process according to the first modification. As illustrated in FIG. 14, in this modification, the pair selection unit 29 selects at random a plurality of sets according to weight W($\theta$i), and acquires m pairs.

The pair selection unit 29 refers to the pair candidate table 140 for example, and inputs sets that are determined to be appropriate (S231). The pair selection unit 29 calculates a weight W($\theta$i) on the basis of formula 3 with respect to each input set (S232). The pair selection unit 29 calculates a total sum Wsum of the weights on the basis of the calculated weights W($\theta$i) (S233).

The pair selection unit 29 performs initialization so as to set stored pair number i=0 (S234). The pair selection unit 29 determines a random number r from 0 to Wsum (S235). The pair selection unit 29 determines the set j according to the random number r (S236).

The pair selection unit 29 determines whether or not any feature point in the set j is a feature point pair that is stored as a third pair candidate (S237). When all the feature point pairs are already stored (YES in S237), the process returns to S235 and the process is repeated.

The pair selection unit 29 determines whether or not any feature point pair in the set j overlaps with any feature point pair that is stored as a third pair candidate (S238). When none of them overlap with each other (NO in S238), the pair selection unit 29 stores two groups of feature point pairs in the set j as third pair candidates (S239), and sets i=i+2 (S240). When some feature points overlap with each other (YES in S238), the pair selection unit 29 stores feature point pairs that do not overlap with one another (S241), and sets i=i+1 (S242).

The pair selection unit 29 repeats the processes from S236 when i<m (NO in S243), and advances the process to S225 in FIG. 12 when i≥m (YES in S243).

As described above, according to the first modification, in addition to the effect of the image processing system 1 according to the above embodiment, a set of feature point pairs is selected by putting a larger weight on a determination angle with a higher frequency, so that it is expected that an appropriate feature point pair will be preferentially selected. As a result, a third pair candidate can be more appropriately selected.

The weight is described using a normal distribution as an example; however, a function for similarly selecting a set with a determination angle of a high frequency can also be used as a weight.

[Second Modification]

Hereinafter, a second modification will be described. In the second modification, the same numerals are assigned to the same configurations and operation as those in the image processing system 1 according to the above embodiment or the first modification, and detailed descriptions thereof will be omitted. The second modification is a modification of the above embodiment, for example the pair selection process in S224, similarly to the first modification. In the second modification, the system configuration is the same as that in the image processing system 1.

Figure 15:
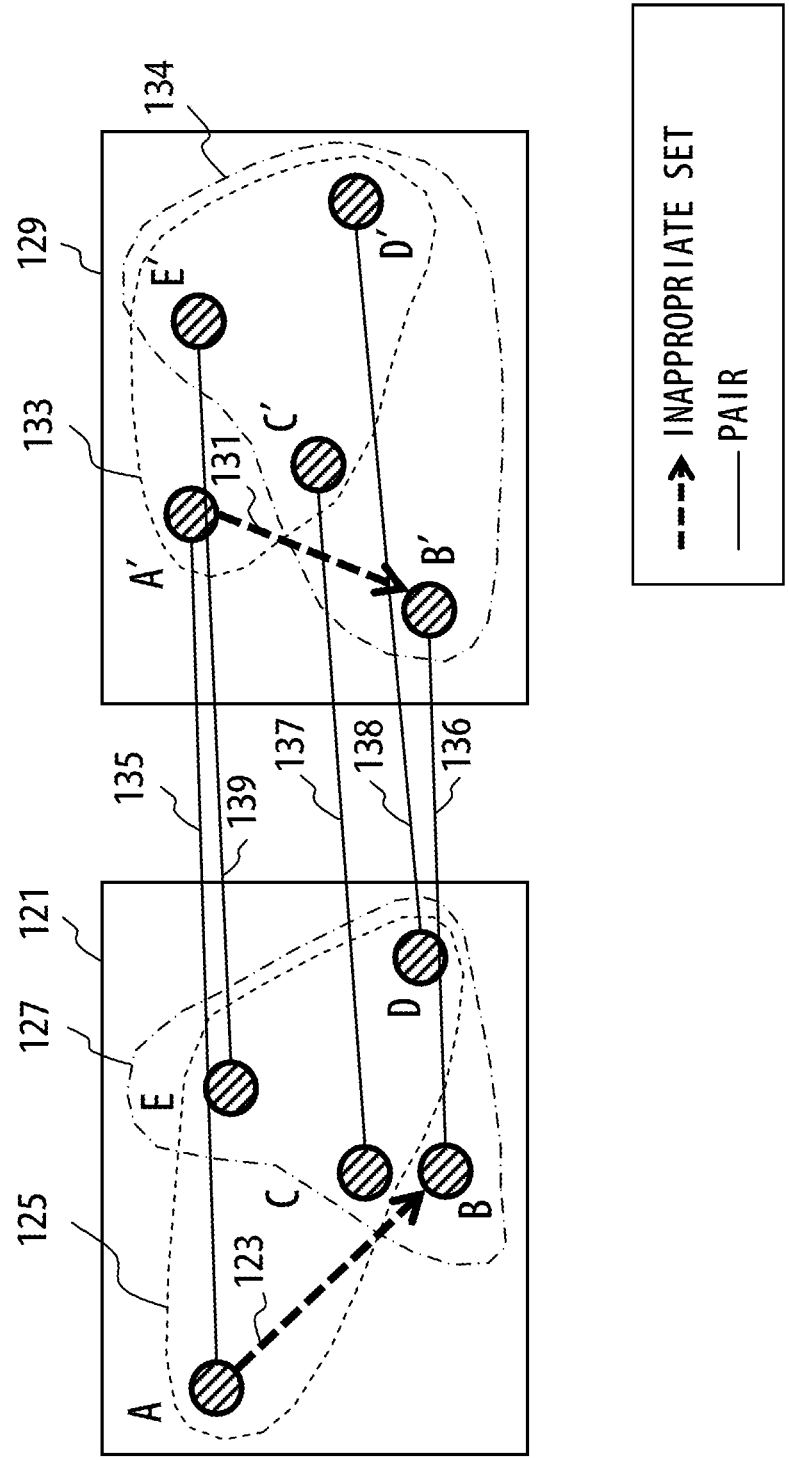
FIG. 15 is a diagram illustrating an example for selecting an appropriate set in a pair selection process according to a second modification.

FIG. 15 is a diagram illustrating an example for selecting an appropriate set in a pair selection process. As illustrated in FIG. 15, feature points A to E in a first image 121 and feature points A' to E' in a second image 129 are determined to be pairs 135 to 139, respectively. At this time, for example, if it is assumed that a feature point pair AA' is a first feature point pair, a set of the feature point pair AA' and a feature point pair BB' is an inappropriate set since the angle between a first vector AB and a second vector A'B' exceeds a threshold value $\theta$th. At this time, combinations that are possible when m=4, that is, third pair candidates, are the following two groups.

The two groups are, the combination of the feature point pairs AA', CC', DD', and EE' and the combination of BB', CC', DD', and EE'.

Figure 16:
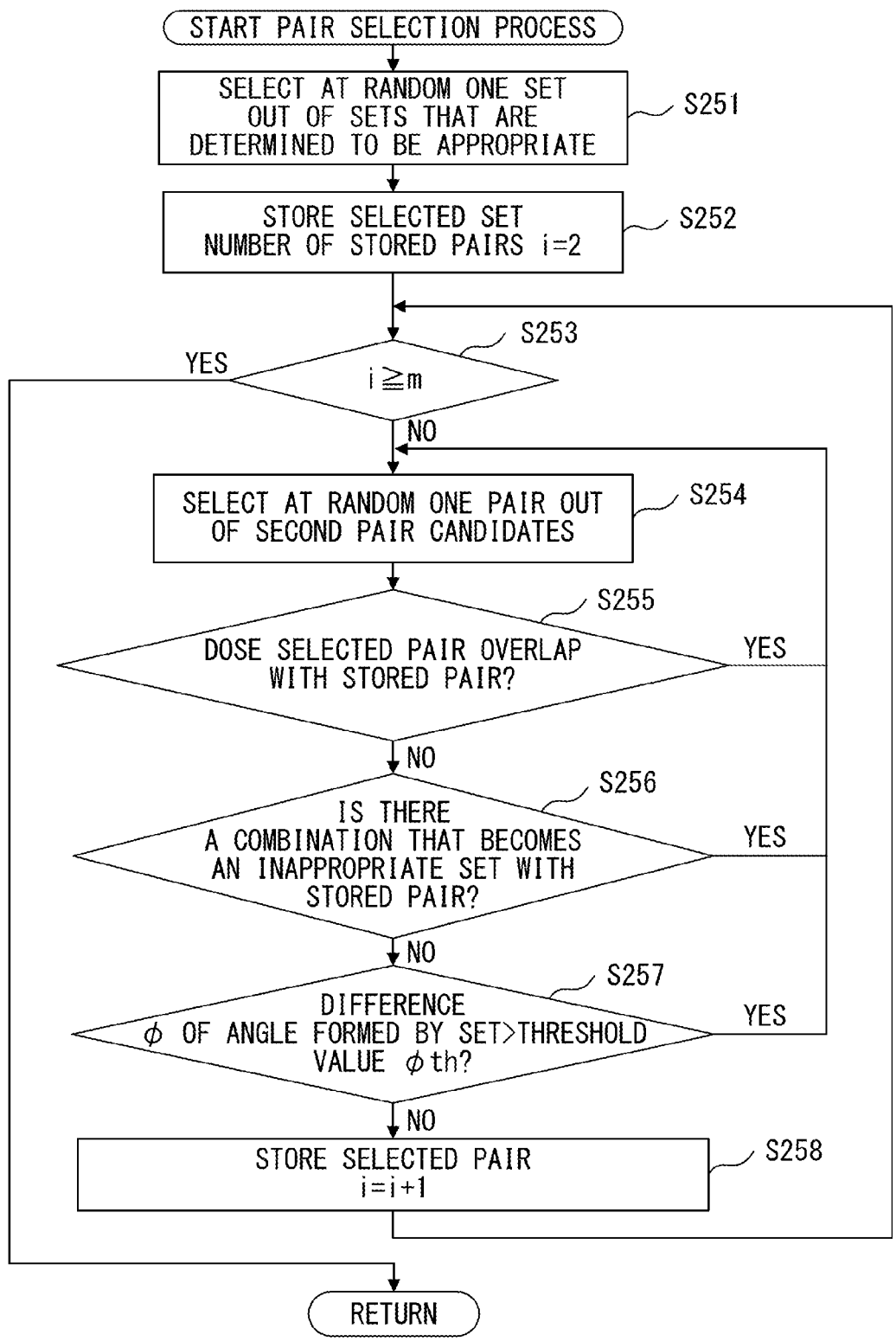
FIG. 16 is a flowchart illustrating an example of a pair selection process according to the second modification.

FIG. 16 is a flowchart illustrating one example of the pair selection process according to the second modification. As illustrated in FIG. 16, the pair selection unit 29 refers to, for example, the pair candidate selection table 140, and selects at random one set from sets that are determined to be appropriate (S251). The pair selection unit 29 stores two feature point pairs that are included in the selected set as third pair candidates, and sets the number of stored pairs i=2 (S252).

The pair selection unit 29 advances the process to S225 in FIG. 12 when i≥m (YES in S253), and advances the process to S254 when i<m (NO in S253). The pair selection unit 29 refers to the pair candidate table 140 for example, and selects at random one pair from second pair candidates that are not determined to be inappropriate (S254).

The pair selection unit 29 determines whether a selected pair is an appropriate combination with the stored pairs. When the selected pair overlaps with any of the stored pairs (YES in S255), the pair selection unit 29 repeats the processes from S254. When the selected pair does not overlap with the stored pairs of the third pair candidates (NO in S245), the pair selection unit 29 determines whether or not there is a combination that will become an inappropriate set with the stored pairs (S256). An inappropriate set is a set with a determination angle θ exceeding a threshold value θth as described above.

For example, it is assumed that when the feature point pair BB' and the feature point CC' are stored in FIG. 15, the feature point pair DD' is selected in S254. At that time, the pair selection unit 29 determines whether or not the set of the feature point pair BB' and the feature point pair CC' and the set of the feature point pair CC' and the feature point pair DD' are appropriate sets. When there is an inappropriate combination (YES in S256), the pair selection unit 29 repeats the processes from S254.

When there are no inappropriate combinations (NO in S256), the pair candidate table 140 is referred to for example, and it is determined whether or not an angle difference φ=θ1−θ2 of angles that are formed by target sets exceeds a threshold value φth (S257). At that time, θ1 and θ2 are respective determination angles of two sets. When the angle difference φ exceeds the threshold value φth (YES in S257), the pair selection unit 29 repeats the processes from S254. When the angle difference does not exceeds the threshold value (NO in S257), the pair selection unit stores the selected pair as a third pair candidate, sets i=i+1, and returns the process to S253 (S258).

When the precondition is that the angle between two images be within a fixed value, the determination angle θ is within the threshold value φth as described above. In addition, when two appropriate sets are focused on, the maximum value φth of the difference in angles of the two sets satisfies φth<2θth. Therefore, when there are no inappropriate sets in S256, the difference in angles of any two sets in the stored pairs is determined in S257, and if φ>φth, the pair selection unit 29 returns the process to S254. When φ≤φth, the pair selection unit advances the process to S258. The processes from S254 to S258 are repeated until the number of stored pairs as third candidates becomes equal to or greater than m, and the result is passed over to the process in S225 in FIG. 12.

The maximum value φth of the difference in determination angles of two sets may be determined in the same manner as in a threshold value θth of a determination angle, by using assumed angles x, y, and z between two images. For example, coordinates of four corners of a quadrangle can be subjected to rotational/perspective projective transformation by using x, y, and z. Two pairs of coordinates before and after transformation are combined to determine a set and an angle formed by the set. A process for determining angle difference φ=|θi−θj| (θi and θj are determination angles of sets that are different from each other) is executed while changing combinations, and the maximum angle is set to be the maximum value φth.

As described above, according to the image processing system 1 according to the second modification, in addition to the effect of the image processing system 1 according to the above embodiment, inappropriate sets are not included in the third pair candidates. Therefore, it is possible to more appropriately select the third pair candidates, and accurate image matching is made possible. For example, the above effect can be obtained by proceeding to the process in S258 after the process in S256, without executing the process in S257.

(Third Modification)

Hereinafter, a third modification will be described. In the third modification, the same numerals are assigned to the same configurations and operations as those in the image processing system 1 according to the above embodiment, the first modification, or the second modification, and detailed descriptions thereof will be omitted. The third modification is a modification of the set selection process in S241 of the second modification. In the third modification, the system configuration is the same as that in the image processing system 1.

FIG. 17 is a flowchart illustrating one example of set selection according to the third modification. As illustrated in FIG. 17, the pair selection unit 29 refers to the pair candidate table 140 for example, and inputs sets that are determined to be appropriate (S261). The pair selection unit 29 calculates a weight W (θi) on the basis of formula 3, with respect to each input set (S262). The pair selection unit 29 calculates total sum Wsum of the weights on the basis of the calculated weights W(θi) (S263). The pair selection unit 29 determines a random number r from 0 to Wsum (S264). The pair selection unit 29 determines a set j corresponding to the random number r (S235).

As described above, according to the image processing system 1 according to the third modification, in addition to the effect of the second embodiment, it is expected that a set with a determination angle of a high frequency will be preferentially selected, so that a third pair candidate can be more appropriately selected, and accurate image matching is made possible.

According to an image matching method, an image processing system, and a program of the embodiment, feature points that are targets of image matching can be narrowed down.

The present invention is not limited to the embodiment hereinbefore described and various configurations or embodiments can be adopted without departing from the gist of the present invention. For example, the second image may also be transmitted from the client 11 to the server 3. An image that is stored in the storage device 19 instead of an image photographed by the camera 22 maybe transmitted to the server 3 as the first image or the second image. The image that is stored in the server 3 or the client 11 may include only coordinates of feature points and feature amounts. The above embodiment and the first to third modifications can be combined in various ways as long as there are no discrepancies in logic with each other.

Hereinafter, an example of a computer that is commonly applied in order to cause the computer to execute operations for the image matching method according to the above embodiment and the modifications 1 to 3 will be described.

FIG. 18 is a block diagram illustrating one example of a hardware configuration of a standard computer. As illustrated in FIG. 18, in a computer 300, a central processing unit (CPU) 302, a memory 304, an input device 306, an output device 308, an external storage device 312, a medium drive device 314, a network connection device, etc., are connected to one another via a bus 310.

The CPU 302 is an processor that controls all the operations of the computer 300. The memory 304 is a storage unit that stores in advance a program for controlling the operation of the computer 300, and is used as a working area as necessary when executing the program. Examples of the memory 304 include a Random Access Memory (RAM) and a Read Only Memory (ROM). The input device 306 is a device for acquiring input of various pieces of information from a user which are associated with an operation content, and it sends the acquired input information to the CPU 302 when the input device is operated by the user of the computer, and examples of the input device include a keyboard device and a mouse device. The output device 308 is a device for outputting of a processing result by the computer 300, and examples of the output device include a display device. For example, the display device displays a text and an image according to display data that is sent by the CPU 302.

The external storage device 312 is a storage device such as a hard disk, and is a device that stores various control programs that are executed by the CPU 302, stores acquired data, etc. The medium driving device 314 is a device for executing writing and reading to and from a portable recording medium 316. The CPU 302 can also execute various processes by reading out and executing a predetermined control program that is stored in the portable recording medium 316 via the medium driving device 314. Examples of the portable recording medium 316 include a Compact Disc (CD)-ROM, a Digital Versatile Disc (DVD), and a Universal Serial Bus (USB) memory. The network connection device 318 is an interface device that manages various data transfers with the outside wirelessly or non-wirelessly. The bus 310 is a communication path that connects the above respective devices to one another and transfers data.

The program for causing the computer to execute the image matching method according to the above embodiment and modifications 1 to 3 is stored, for example, in the outside storage device 312. The CPU 302 reads out the program from the external storage device 312, and causes the computer 300 to perform operations for image matching. At that time, at first, a control program for causing the CPU 302 to execute an image matching process is created and is stored in the external storage device 312. Then, predetermined instructions are given from the input device 306 to the CPU 302, so as to cause this control program to be read out from the external storage device 312 and to be executed. The program may also be stored in the portable storage medium 316.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. An image matching method comprising:
    creating first pair candidates that include a plurality of feature point pairs each of which includes a first feature point of a first image and a second feature point of a second image that correspond to each other from a plurality of feature points that are extracted from the first image and the second image, by a processor;
    determining a first feature point pair to be deleted from the first pair candidates on the basis of a result of comparison between a predetermined angle and an angle between a first vector that connects a first feature point of the first feature point pair and a first feature point of a second feature point pair, and a second vector that connects a second feature point of the first feature point pair and a second feature point of the second feature point pair, with respect to the one or more second feature point pairs for the first feature point pair from among the created first pair candidates, by the processor; and
    performing matching between the first image and the second image on the basis of the feature point pairs that are included in second pair candidates that are obtained by excluding the first feature point pair that is determined to have been deleted from the first pair candidates, by the processor.

2. The image matching method according to claim 1, wherein
    in the determining, a first feature point pair is determined to have been deleted from the first pair candidates when the ratio of the number of cases in which the angle exceeds the predetermined angle to the number of second feature point pairs that are subjected to the comparison is equal to or greater than a predetermined value.

3. The image matching method according to claim 1 further comprising:
    selecting third pair candidates that include a first predetermined number of feature point pairs from the second pair candidates, the first predetermined number being two or more, by the processor; and
    estimating a matrix that is used for matching between the first image and the second image on the basis of the third pair candidates, by the processor, wherein
    the determining is executed on a particular number or greater of the second feature points, the particular number corresponding to a probability that is an expected probability that a feature point pair that is included in the third pair candidates will be appropriate for estimating the matrix.

4. The image matching method according to claim 3, wherein
    the estimating the matrix is executed on the basis of a second predetermined number of groups of the first predetermined number of feature point pairs, and the second predetermined number is a number that corresponds to a probability that is acceptable as a probability that the matrix will not be able to be determined at all on the basis of the second predetermined number of groups, and corresponds to a probability that it will be determined that the first feature point pair will be deleted as a result of the determination.

5. The image matching method according to claim 3, wherein
    the selecting selects the third pair candidates on the basis of a predetermined number of the first feature point pairs, the predetermined number being one or more, and the second feature point pairs that are selected at random from the second pair candidates by weighting an expected distribution of the angles according to two groups of feature point pairs that are not deletion targets by the process for determination and that are different from each other.

6. The image matching method according to claim 3, wherein
the selecting the third pair candidates selects as the third pair candidates the first and second feature point pairs that do not overlap with the already selected third pair candidates, when an angle is within the predetermined angle, and the angle is between a first vector that connects the first feature point of the first feature point pair and the first feature point of the second feature point pair, and a second vector that connects the second feature point of the first feature point pair and the second feature point of the second feature point pair, with respect to the second feature point pair for the first feature point pair that is selected from the second pair candidates.

7. The image matching method according to claim 3, wherein
the selecting the third pair candidates selects as the third pair candidates two groups of the first feature point pair and the second feature point pair that are selected from the second pair candidates when the difference between a first angle corresponding to one of the two groups of the first feature point pair and second feature point pair and a second angle corresponding to the other satisfies a predetermined condition.

8. The image matching method according to claim 6, wherein
the selecting the first feature point pair and the second feature point pair from the second pair candidates selects at random the first feature point pair and the second feature point pair by weighting an expected distribution of the angles according to two groups of feature point pairs that are not deletion targets by the determining and that are different from each other.

9. An image processing system comprising:
at least one storage device configured to store a plurality of feature points that are extracted from a first image and a second image, and feature amounts in the feature points; and
a processor configured to
create first pair candidates that include a plurality of feature point pairs each of which includes a first feature point of the first image and a second feature point of the second image which correspond to each other from the feature points and the feature amounts, cause any of the storage devices to store the first pair candidates,
determine a first feature point pair to be deleted from the first pair candidates on the basis of a result of comparison between a predetermined angle and an angle between a first vector that connects a first feature point of the first feature point pair and a first feature point of a second feature point pair, and a second vector that connects a second feature point of the first feature point pair and a second feature point of the second feature point pair, with respect to the one or more second feature point pairs for the first feature point pair from among the created first pair candidates, and cause the storage device to store a determination result, and
perform matching between the first image and the second image on the basis of feature point pairs that are included in second pair candidates that are obtained by excluding the first feature point pair that is determined to have been deleted from the first pair candidates.

10. The image processing system according to claim 9, wherein
the processor determines that a first feature point pair has been deleted from the first pair candidates when the ratio of the number of cases in which the angle exceeds the predetermined angle to the number of second feature point pairs that are subjected to the comparison is equal to or greater than a predetermined value.

11. The image processing system according to claim 10, wherein the processor
selects third pair candidates that include a first predetermined number of feature point pairs from the second pair candidates, the first predetermined number being two or more,
estimates a matrix that is used for matching between the first image and the second image on the basis of the third pair candidates, and
determines with respect to a particular number or more of second feature points, the particular number corresponding to the probability that is an expected probability that a feature point pair that is included in the third pair candidates will be appropriate for estimating the matrix.

12. The image processing system according to claim 9, wherein
the processor estimates on the basis of a second predetermined number of groups of a first predetermined number of feature point pairs, and the second predetermined number is a number that corresponds to a probability that is acceptable as a probability that a matrix will not be able to be determined at all on the basis of the second predetermined number of groups, and corresponds to a probability that it will be determined that the first feature point pair will be deleted as a result of the determination.

13. The image processing system according to claim 11, wherein
the processor selects the third pair candidates on the basis of a predetermined number of the first feature point pairs, the predetermined number being one or more and the second feature point pairs that are selected at random from the second pair candidates by weighting an expected distribution of the angles according to two groups of feature point pairs that are not deletion targets by the process for determination and that are different from each other.

14. The image processing system according to claim 11, wherein
the processor selects as the third pair candidates the first and second feature point pairs that do not overlap with the already selected third pair candidates, when an angle is within a predetermined angle and the angle is between a first vector that connects a first feature point of the first feature point pair and a first feature point of the second feature point pair, and a second vector that connects the second feature point of the first feature point pair and the second feature point of the second feature point pair with respect to the second feature point pair for the first feature point pair that is selected from the second pair candidates.

15. A non-transitory computer-readable recording medium having stored therein a program for causing a computer to execute a process comprising:
creating first pair candidates that include a plurality of feature point pairs each of which includes a first feature point of a first image and a second feature point of a second image that correspond to each other from a plurality of feature points that are extracted from the first image and the second image;

determining a first feature point pair to be deleted from the first pair candidates on the basis of a result of comparison between a predetermined angle and an angle between a first vector that connects a first feature point of a first feature point pair and a first feature point of a second feature point pair, and a second vector that connects a second feature point of the first feature point pair and a second feature point of the second feature point pair, with respect to the one or more second feature point pairs for the first feature point pair from among the created first pair candidates; and performing matching between the first image and the second image on the basis of the feature point pairs that are included in second pair candidates that are obtained by excluding the first feature point pair that is determined to have been deleted from the first pair candidates.

* * * * *